(12) United States Patent
Diehl et al.

(10) Patent No.: US 6,197,071 B1
(45) Date of Patent: Mar. 6, 2001

(54) FORMULATIONS FOR DYEING KERATIN FIBERS COMPRISING A PYRAZOLOTRIAZOLE COUPLER AND OXIDATION BASE

(75) Inventors: Donald R. Diehl, Rochester; Mbiya Kapiamba, Penfield; Stanley W. Cowan, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/416,823

(22) Filed: Oct. 12, 1999

Related U.S. Application Data

(63) Continuation-in-part of application No. 09/218,511, filed on Dec. 22, 1998.

(51) Int. Cl.$^7$ ..................................................... A61K 7/13
(52) U.S. Cl. .......................... 8/409; 8/407; 8/423; 8/573
(58) Field of Search ............................ 8/407, 408, 409, 8/410, 423, 573, 649; 430/558

(56) References Cited

U.S. PATENT DOCUMENTS

| | | | |
|---|---|---|---|
| 3,810,761 | 5/1974 | Bailey et al. | 430/522 |
| 5,492,798 | * 11/1999 | Kita et al. | 430/558 |
| 5,848,601 | * 9/1999 | Rieger | 430/558 |
| 5,985,532 | * 11/1999 | Bose et al. | 430/558 |

FOREIGN PATENT DOCUMENTS

| | | | |
|---|---|---|---|
| 923929 | * 6/1999 | (EP) | . |
| 10133342 | 5/1988 | (JP) | . |
| 10161284 | 6/1988 | (JP) | . |
| 97/35551 | * 6/1999 | (WO) | . |

* cited by examiner

*Primary Examiner*—Caroline D. Liott
(74) *Attorney, Agent, or Firm*—Arthur E. Kluegel

(57) ABSTRACT

Formulations for the oxidation dyeing of keratin fibers comprising a coupler and oxidation base. The couplers are represented by the following structure:

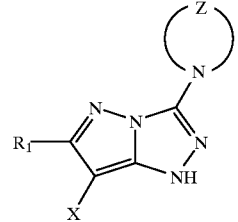

wherein:
Z represents the elements of C, N, O, or S necessary to complete a substituted or unsubstituted heterocyclic 5 or 6 member ring along with nitrogen;
$R_1$ represents a substituent group;
and, X represents a hydrogen or a coupling off group.

14 Claims, No Drawings

FORMULATIONS FOR DYEING KERATIN FIBERS COMPRISING A PYRAZOLOTRIAZOLE COUPLER AND OXIDATION BASE

CROSS-REFERENCE TO RELATED APPLICATIONS

This application is a continuation-in-part of U.S. Ser. No. 09/218,511 filed Dec. 22, 1998, the contents of which are incorporated herein by reference.

FIELD OF THE INVENTION

This invention relates to light sensitive silver halide color photographic elements, heterocyclic dye-forming couplers and azomethine dyes and colorant formulations containing same. They exhibit improved light stability. Also described is a simple method of synthesis of the novel couplers.

BACKGROUND OF THE INVENTION

In the photographic art color images are formed by the exposure of a silver halide light sensitive element containing organic dye forming couplers followed by processing in aqueous developer solutions containing an aromatic primary amine color developing agent. The resultant dyes formed are yellow, magenta, or cyan and result in the formation of a color image in the photographic element.

There are several heterocyclic organic materials known to form magenta or cyan images such as pyrazolones, pyrazolobenzimidazoles, pyrazolotriazoles, indazoles, imidazopyrazoles, and imidazoimidazoles. The heterocyclic nitrogen compound pyrazolotriazole is extensively used in modem photographic color materials. Bailey's original patent BP 1,252,418 (1971) describes the pyrazolo[5,1-c]-1,2,4-triazole heterocyclic nitrogen compound for use in photographic elements.

Color forming image dyes in photographic elements must have desirable hues and good stability with little or no fading or discoloration under storage in the dark or when exposed to light. The couplers which form these dyes should have good coupling efficiency and lead to dye images with high contrast and high density in areas of maximum exposure and low density in areas of minimum exposure.

It is well recognized by those skilled in the art that modifications of the structure of the substituents on the pyrazolo[5,1-c]-1,2,4-triazole heterocycle can have important effects on the dyes formed from these couplers, including improvements in dye image stability, etc. Thus, the researcher skilled in the art of photographic couplers is always seeking new substituents on the pyrazolo[5,1-c]-1,2,4-triazole heterocycle with an aim to discover ever better image dye properties. In recent years many patents have been issued on variations of the 3-alkyl substituted pyrazolo[5,1-c]-1,2,4-triazole couplers. These couplers have the required hue, contrast, and efficiency properties necessary to produce superior image dyes in modem photographic materials. Nevertheless, new substituent research continues.

In Bailey's original patent BP 1,252,418 (1971) a wide range of substituents are described as useful in varying the hue and properties of pyrazolo[5,1-c]-1,2,4-triazole image dyes. In particular, Bailey describes the 3-heterocyclic substituents pyridine and thiophene. Recently, Iizuka et.al. JP 10161284 (1998) have described the 5 member ring α-substituted pyrrole, imidazole, pyrazole, thiophene, furan, thiazole, oxazole, and triazole heterocycles as particular couplers with improved performance compared to 3-alkyl substituted pyrazolo[5,1-c],-1,2,4-triazole couplers. Iizuki et. al. in JP 10133342 (1998) also describe the 6 member ring a substituted pyridine, pyridazine, pyrimidine, pyrazine, and benzoxazole heterocycles with improved performance compared to 3-alkyl substituted pyrazolo[5,1-c]-1,2,4-triazole couplers. These couplers may generically be described by structure A below in which Z represents the elements of C, N, O, and S required to form 5 and 6 member rings containing a R substituent in the α position of the ring adjacent to the carbon bonding the heterocycle to the 3 position of the pyrazolo[5,1-c]-1,2,4-triazole ring.

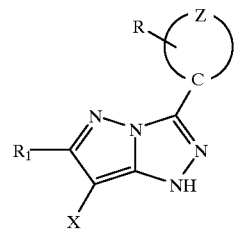

Coupler structure A
from JP 10133342 (1998)
and JP 10161284 (1998)

It should be particularly noted in this structure that the heterocycle bonded to the 3 position of the pyrazolo[5,1-c]-1,2,4-triazole ring is bonded to a carbon atom of the heterocyclic substituent. This is a common feature of heterocyclic substituted pyrazolo[5,1-c]-1,2,4-triazole couplers dating back to the originally disclosed pyridine and thiophene substituents of Bailey BP 1,252,418 (1971).

The Chemical Abstracts registry file reveals that no pyrazolo[5,1-c]-1,2,4-triazole couplers have been reported in which the 3 position of the pyrazolo[5,1-c]-1,2,4-triazole ring is bonded to a nitrogen atom of the heterocyclic substituent. Broad disclosures of pyrazole compounds bearing a wide variety of substituents including heterocycles such as pyrazolyl groups have been mentioned (WO 97/35551) but there has been no specific disclosure with a pyrazolo[5,1-c]-1,2,4-triazole, and there has been disclosed no method of synthesis of such compounds. The synthesis of such novel pyrazolo[5,1 -c]-1,2,4-triazole couplers is unknown to those skilled in the art. The properties of such unknown pyrazolo[5,1-c]-1,2,4-triazole couplers would be of very high interest to the skilled photographic coupler researcher.

We now wish to report the simple synthesis of these novel pyrazolo[5,1 -c]-1,2,4-triazole couplers, the formation of novel azomethine dyes therefrom, and the improved light stability demonstrated by these dyes in comparison to dyes from 3-alkyl substituted pyrazolo[5,1-c]-1,2,4-triazole couplers in a photographic element.

SUMMARY OF THE INVENTION

In accordance with the present invention there is provided a photographic element bearing a silver halide emulsion layer associated with a nitrogen heterocycle substituted pyrazolo[5,1-c]-1,2,4-triazole coupler having the structure I below:

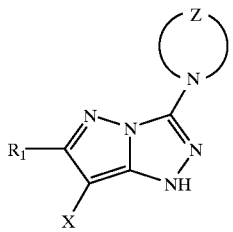

I wherein:

Z represents the elements of C, N, O, or S necessary to complete a substituted or unsubstituted heterocyclic 5 or 6 member ring group along with nitrogen;

$R_1$ represents a substituent group;

and, X represents a hydrogen or a coupling off group, The invention also provides a simple method of synthesis of the aforementioned nitrogen heterocycle substituted pyrazolo[5,1-c]-1,2,4-triazole, and novel azomethine dyes associated with the aforementioned nitrogen heterocycle substituted pyrazolo[5,1-c]-1,2,4-triazole.

The element of this invention, upon conventional photographic processing, provides dyes that have desirable spectral absorption characteristics and good stability.

The coupler compounds of the invention may also be employed in colorant formulations such as hair dye formulations.

DETAILED DESCRIPTION OF THE INVENTION

Novel heterocycle substituted pyrazolo[5,1 -c]-1,2,4-triazole couplers may be synthesized by using a 3-substituted-4-amino-5-mercapto-1,2,4-triazole in which the 3 substituent may be either amine or hydrazine. Novel azomethine dyes are formed upon reaction of an oxidized primary aromatic amine with the novel pyrazolo[5,1-c]-1,2, 4-triazole couplers of this invention. Preferred couplers of this invention upon suitable coating in a silver halide photographic material provide, after conventional photographic processing, magenta dyes with a spectral absorption peak in the region of the spectrum from 500 to 600 nm with a half band width of less then 120 nm, preferably less than 100 nm and most preferably less than 90 nm and exhibit the property of good light and dark stability.

The novel couplers of structure I may be represented by the couplers bearing a 5 member saturated or unsaturated heterocyclic ring attached to the 3 position of the pyrazolo [5,1-c]-1,2,4-triazole and the couplers bearing a 6 member saturated or unsaturated heterocyclic ring attached to the 3 position of the pyrazolo[5,1-c]-1 ,2,4-triazole. The 5 member ring and the 6 member ring may be further substituted without limitations. The 5 member ring and the 6 member ring may also comprise a part of a larger multi-ring heterocyclic substituent on the 3 position of the pyrazolo[5,1 -c]-1,2,4-triazole coupler.

Examples of monocyclic, bicyclic, and tricyclic heterocyclic rings which may be suitable substituents on the 3 position of the pyrazolo[5,1-c]-1,2,4-triazole include, but are not limited by, the following: benzoisothiazolone-1,1-dioxide, benzothiazinedioxide, benzothiopyrano[4,3-c] pyrazole, benzotriazole, hydantoin, imidazo[1,2-a] pyrimidine, imidazo[2,1-b]quinazoline, imidazo[2,1-c]1 ,2,4-triazine, imidazo[4,5-b]pyridine, imidazole, imidazoline, indazole, indole, isoindole, isoquinoline, isothiazoline, maleimide, morpholine, naphthalimide, oxazolidine, oxazolidinedione, phthalazine, phthalimide, piperidine, piperazine, pteridone, purine, pyrano[2,3-c] pyrazole, pyrano[4,3-c]pyrazole, pyrazole, pyrazolidine, pyrazolinone, pyrazolo[3,4-b]quinoxaline, pyrazolo[3,4-d] pyridazine, pyridazine, pyrido[2,3-d]pyridazine, pyrimidine, pyrrole, pyrrolidine, pyrroline, pyrrolo[2,3-d] pyrimidine, pyrrolo[3,2-c]quinoline, pyrrolo[3,4-d] pyrimidine, pyrrolone, quinazoline, quinoline, rhodanine, succinimide, tetrahydropyridine, tetrazole, thiadiazine, thiadiazole, thiazolidine, thieno[3,4-c]pyrazole, thieno[3,4-c]pyrrole-1,1-dioxide, thiomorpholine-1,1-dioxide, triazine, triazole, and a triazolo[4,3-a]pyrimidine group. The heterocyclic rings are preferably substituents which substantially cannot be eliminated when the couplers of the invention are reacted with the oxidized species of a primary aromatic amine derivative.

Especially preferred heterocycles are pyrrole, pyrazole, pyrazolone, pyridazinone, and phthalazinone groups.

Examples of substituents on the heterocyclic rings attached to the pyrazolo[5,1-c]-1,2,4-triazole may typically include, but are not limited by, the following: a halogen atom such as chlorine or bromine; an aliphatic group having preferably 1 to 32 carbon atoms which may be linear, branched or cyclic, and saturated or unsaturated, for example, alkyl, aralkyl, alkenyl, alkynyl, cycloalkyl, and cycloalkenyl, such as methyl, ethyl, propyl, isopropyl, t-butyl, tridecyl, 2-methanesulfonylethyl, 3-(3-pentadecylphenoxy)propyl, 3-[4-{2-[4-(4-hydroxyphenylsulfonyl)phenoxy]dodecanamide}phenyl] propyl, 2-ethoxytridecyl, trifluoromethyl, cyclopentyl, and 2-(2,4-di-t-amylphenoxy)propyl; aryl having preferably 6 to 50 carbon atoms, for example, phenyl, 4-t-butylphenyl, 2,4-di-t-amylphenyl, and 4-tetradecanamidephenyl; heterocyclic groups having preferably I to 50 carbon atoms, for example, 2-furyl, 2-thienyl, 2-pyrimidinyl, and 2-benzothiazolyl; cyano; hydroxy; nitro; carboxyl, sulfo; amino; alkoxy having preferably 1 to 50 carbon atoms, for example, methoxy, ethoxy, 2-methoxyethoxy, 2-dodecylethoxy, and 2-methanesulfonylethoxy; aryloxy having preferably 6 to 50 carbon atoms, for example, phenoxy, 2-methylphenoxy, 4-t-butylphenoxy, 3-nitrophenoxy, 3-t-butyloxycarbamoylphenoxy, and 3-methoxycarbamoyl; acylamino having 2 to 50 carbon atoms, for example, acetamido, benzamido, tetradecanamido, 2-(2,4-di-t-amylphenoxy)butanamido, 4-(3-t-butyl-4-hydroxyphenoxy)butanamido, and 2-[4-(4-hydroxyphenylsulfonyl)phenoxy]butanamido, and 2-[4-(4-hydroxyphenylsulfonyl)phenoxy] decanamido; alkylamino having preferably 1 to 50 carbon atoms, for example, methylamino, butylamino, dodecylamino, diethylamino, and dimethylamino; anilino having preferably 6 to 50 carbon atoms, for example, phenylamino, 2-chloroanilino, 2-chloro-5-tetradecaminoanilino, N-acetylanilino, and 2-chloro-5-[2-(3-t-butyl-4-hydroxyphenoxy)dodecanamide] anilino; ureido having preferably 2 to 50 carbon atoms for example, phenylureido, methylureido, and N,N-dibutyrylureido; sulfamoylamino having preferably 1 to 50 carbon atoms, for example, N,N-dipropylsulfamoylamino, and N-methyl-N-decylsulfamoylamino; alkylthio having preferably 1 to 50 carbon atoms, for example, methylthio, octylthio, tetradecylthio, 2-phenoxyethylthio, 3-phenoxypropylthio, and 3-(4-t-butyl-phenoxy)propylthio; arylthio having preferably 6 to 50 carbon atoms, for example phenylthio, 2-butoxy-5-t-octylphenylthio, 3-pentadecylphenylthio, 2-carboxyphenylthio, and 4-tetradecanamidephenylthio; alkoxycarbonylamino having preferably 2 to 50 carbon atoms, for example methoxycarbonylamino, and tetradecyloxycarbonylamino; sulfonamido having preferably 1 to 50 carbon atoms, for example, methanesulfonamido, hexadecanesulfonamido, benzenesulfonamido, p-toluenesulfonamido, octadecanesulfonamido, and 2-methoxy-5-t-butylbenzenesulfonamido; carbamoyl having preferably 1 to 50 carbon atoms, for example, N-ethylcarbamoyl, N,N-dibutylcarbamoyl, N-(2-dodecyloxy-ethyl)carbamoyl, N-methyl-N-dodecylcarbamoyl, and N-[3-(2,4-di-t-amylphenoxy)propyl]carbamoyl; sulfamoyl having preferably up to 50 carbon atoms, for example, N-ethylsulfamoyl, N,N-dipropylsulfamoyl, N-(2-dodecyloxyethyl)sulfamoyl, N-ethyl-N-dodecylsulfamoyl, and N,N-diethylsulfamoyl; sulfonyl having preferably 1 to 50 carbon atoms, for example, methanesulfonyl, octanesulfonyl, benzenesulfonyl, and toluenesulfonyl; alkoxycarbonyl having preferably 2 to 50 carbon atoms, for example, methoxycarbonyl, butyloxycarbonyl, dodecyloxycarbonyl, and octadecyloxycarbonyl; heterocyclyloxy having preferably 1 to 50 carbon atoms, for example, 1-phenyltetrazole-5-oxy, and 2-tetrahydropyranyloxy; azo having preferably 6 to 50 carbon atoms, for example, phenylazo, 4-methoxyphenylazo, 4-pivaloylaminophenylazo, and 2-hydroxy-4-propanoylphenylazo; acyloxy having preferably 2 to 50 carbon atoms, for example, acetoxy; carbamoyloxy having preferably 2 to 50 carbon atoms, for example, N-methylcarbamoyloxy and N-phenylcarbamoyloxy; silyloxy having preferably 3 to 50 carbon atoms, for example, trimethylsilyloxy, and dibutylmethylsilyloxy; aryloxycarbonylamino having preferably 7 to 50 carbon atoms, for example, phenoxycarbonylamino; imido having preferably I to 40 carbon atoms, for example, N-succinimido, N-phthalimido, and 3-octadecenylsuccinimido; heterocylythio having preferably 1 to 50 carbon atoms, for example, 2-benzothiazolythio, 2,4-di-phenoxy-1,3,5-triazole-6-thio, and 2-pyridylthio; sulfinyl having preferably 1 to 50 carbon atoms, for example dodecanesulfinyl, 3-pentadecylphenylsulfinyl, and 3-phenoxypropylsulfonyl; phosphonyl, having preferably 1 to 50 carbon atoms for example, phenoxyphosphonyl, octyloxyphosphonyl, and phenylphosphonyl; aryloxycarbonyl having preferably 7 to 50 carbon atoms, for example, phenoxycarbonyl; acyl having preferably 2 to 50 carbon atoms, for example, acetyl, 3-phenylpropanoyl, benzoyl, and 4-dodecyloxybenzoyl; and azolyl having preferably 1 to 50 carbon atoms, for example, imidazolyl, pyrazolyl, 3-chloro-pyrazole-1-yl, and triazolyl.

When the substituent on the heterocyclic ring is a ballast group it is a group of such size and configuration that, in combination with the remainder of the molecule, it provides the coupler with sufficient bulk that the coupler is substantially non-diffusible from the layer in which it is coated in the photographic element. Representative ballast groups include substituted or unsubstituted alkyl or aryl groups containing 8 to 32 carbon atoms, substituted or unsubstituted alkyloxy, aryloxy, arylthio, alkylthio, alkyloxycarbonyl, aryloxycarbonyl, carboxy, acyl, acyloxy, carbonamido, carbamoyl, alkylcarbonyl, arylcarbonyl, alkylsulfonyl, arylsulfonyl, sulfamoyl, sulfenamoyl, alkylsulfmyl, arylsulfmyl, alkylphosphonyl, arylphosphonyl, alkoxyphosphonyl, and arylphosphonyl. Ballast groups including silicon substituted groups can be employed. Other ballast groups known in the photographic art can be employed.

Examples of $R_1$ substituents in the above mentioned coupler structure I may include but are not limited by the following: a halogen atom, an aliphatic group preferably having from 1 to 36 carbon atoms, an aromatic group preferably having from 6 to 36 carbon atoms (e.g.: phenyl, naphthyl), a heterocyclic group (e.g.: 3-pyridyl, 2-furyl), an alkoxy group (e.g.: methoxy, 2-methoxyethoxy), an aryloxy group (e.g.: 2,4-di-tertamylphenoxy, 2-chlorophenoxy, 4-cyanophenoxy), an alkenyloxy group (e.g.: 2-propenyloxy), an amino group (e.g.: butylamino, dimethylamino, anilino, N-methylanilino), an aliphatic or aromatic acyl group (e.g.: acetyl, benzoyl), an aliphatic or aromatic oxycarbonyl group (e.g.: butoxycarbonyl, phenoxycarbonyl), an aliphatic or aromatic acyloxy group (e.g.: acetoxy, benzoyloxy), an aliphatic or aromatic oxysulfonyl group (e.g.: butoxysulfonyl, phenoxysulfonyl), an aliphatic or aromatic acylamino group (e.g.: acetylamino), a carbamoyl group (e.g.: ethylcarbamoyl, dimethylcarbamoyl), an aliphatic or aromatic sulfonamido group (e.g.: methanesulfonamido), a sulfamoyl group (e.g.: butylsulfamoyl), a sulfamido group (e.g.: dipropylsulfamoylamino), an imido group (e.g.: succinimido, hydantoinyl), a ureido group (e.g.: phenylureido, dimethylureido), an aliphatic or aromatic sulfonyl group (e.g.: methanesulfonyl, benzenesulfonyl), an azo group, an aliphatic or aromatic thio group (e.g.: ethylthio, phenylthio), an aliphatic or aromatic sulfinyl group (e.g.: methanesulfinyl, benzenesulfinyl, naphthalenesulfinyl), a hydroxyl group, a cyano group, a carboxyl group, a nitro group, and a sulfo group. The term "aliphatic group" signifies a straight chain, branched chain, or cyclic aliphatic group, including saturated and unsaturated groups such as alkyl, alkenyl, and alkynyl groups, and groups which have been further substituted. Typical examples of such groups include methyl, ethyl, butyl, dodecyl, octadecyl, icosenyl, iso-propyl, tert-butyl, tert-octyl, tert-dodecyl, cyclohexyl, cyclopentyl, allyl, vinyl, 2-hexadecenyl, and propargyl groups. The term "aromatic group" signifies an aryl group which may have a substitutent.

Especially preferred $R_1$ substituents are alkyl, aryl, alkoxy, amino, anilino, alkoxycarbonyl, carbamoyl, acyl, cyano, sulfone, and sulfonamido, which may be further substituted or unsubstituted.

Examples of COG (coupling off groups) in the above mentioned coupler structure I may include but are not limited by the following: a hydrogen atom or any of the coupling off groups known in the art. Coupling off groups can determine the equivalency of the coupler, can modify the reactivity of the coupler, or can advantageously affect the layer in which the coupler is coated or other layers in the element by performing, after the release from the coupler, such functions as development inhibition, development acceleration, bleach inhibition bleach acceleration, color correction, and the like. Representative classes of coupling off groups include halogen, particularly chlorine, bromine, or fluorine; alkoxy, aryloxy, heterocyclyloxy, heterocyclic, for example, hydantoin and pyrazolo groups, sulfonyloxy, acyloxy, carbonamido, imido, acyl, heterocyclylthio, sufonamido, phosphonyloxy, and arylazo.

Especially preferred coupling off groups include hydrogen and halogen.

Hereunder, the typical examples of the couplers relating to the present invention will be given. However, the present invention shall not be limited thereto.

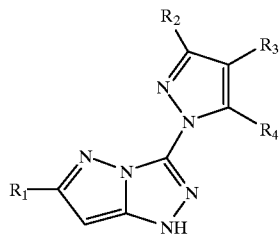

| Invention Coupler | R₁ | R₂ | R₃ | R₄ |
|---|---|---|---|---|
| 1 | t-Bu | Me | H | Me |
| 2 | t-Bu | n-Pr | H | n-Pr |
| 3 | t-Bu | Ph | H | Ph |
| 4 | t-Bu | t-Bu | H | t-Bu |
| 5 | t-Bu | β-Naphthyl | H | β-Naphthyl |
| 6 | t-Bu | Me | Ph | Me |
| 7 | t-Bu | Me | —CH₂CH₂CO₂Et | Me |
| 8 | t-Bu | Me | (3,5-di-t-butyl-4-acetoxybenzyl) | Me |
| 9 | t-Bu | Me | —(CH₂)₃OH | Me |
| 10 | t-Bu | Me | —(CH₂)₄CH₃ | Me |
| 11 | t-Bu | H | H | Me |
| 12 | t-Bu | Me | —NHCOCH₃ | Me |
| 13 | t-Bu | Me | Me | Me |
| 14 | t-Bu | Me | —(CH₂)₃— | |
| 15 | t-Bu | Me | —(CH₂)₄— | |
| 16 | t-Bu | Me | —CH₂CH₂CN | Me |
| 17 | t-Bu | Me | —CONHPh | Me |
| 18 | t-Bu | Ph | OH | Ph |
| 19 | t-Bu | p-C₅H₁₁OPh— | H | p-C₅H₁₁OPh— |
| 20 | t-Bu | Me | (3,5-di-t-butyl-4-hydroxybenzyl) | Me |
| 21 | t-Bu | Me | Et | Me |
| 22 | t-Bu | Me | CN | Me |

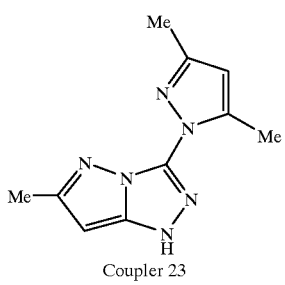

Coupler 23

-continued
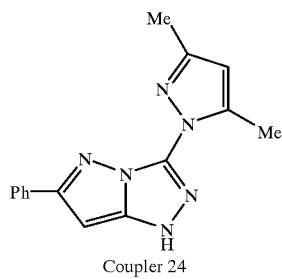
Coupler 24
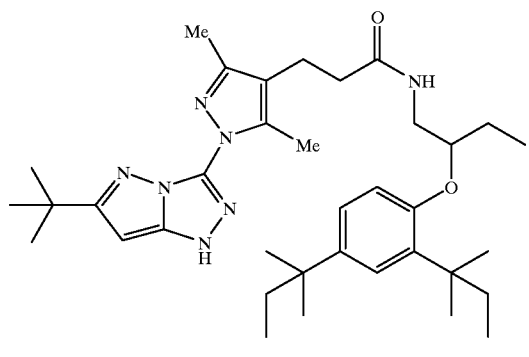
Coupler 25
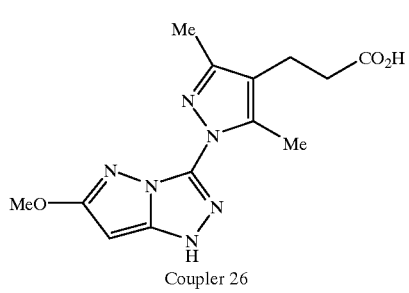
Coupler 26
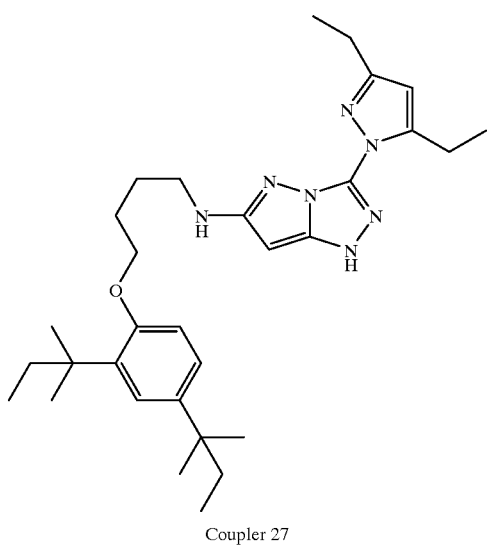
Coupler 27

-continued
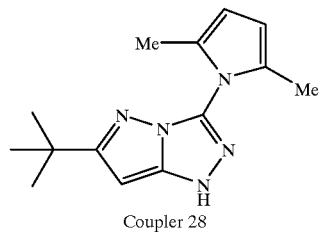
Coupler 28
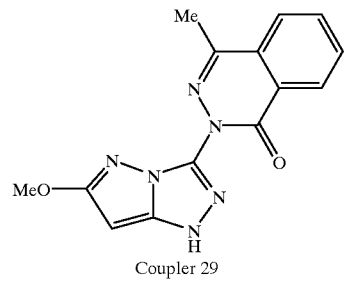
Coupler 29
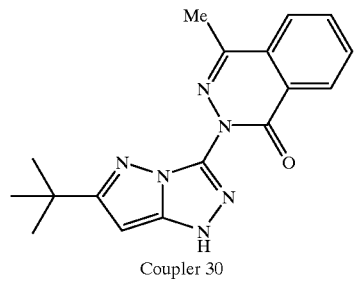
Coupler 30
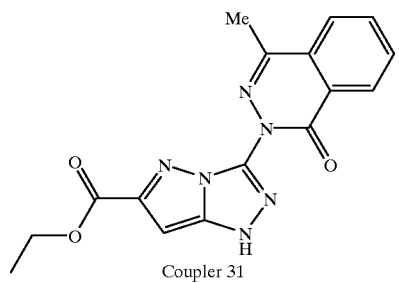
Coupler 31
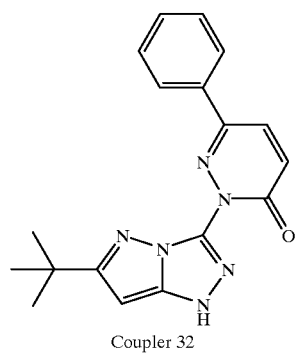
Coupler 32

-continued
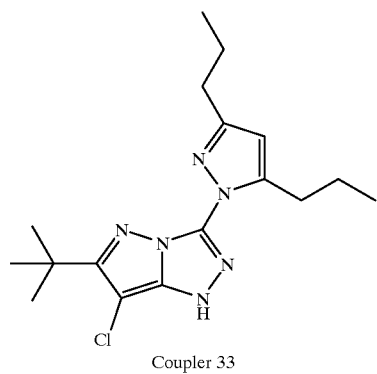
Coupler 33
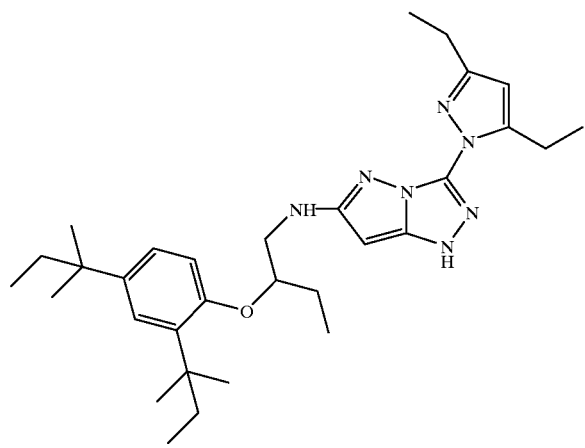
Coupler 34
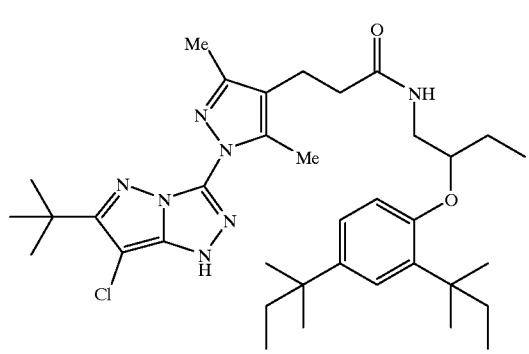
Coupler 35
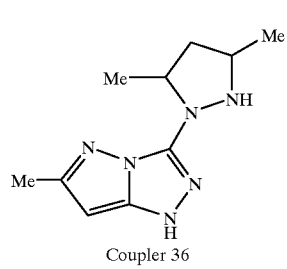
Coupler 36

-continued
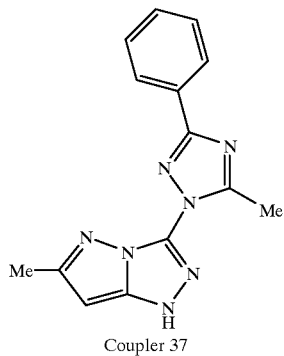
Coupler 37
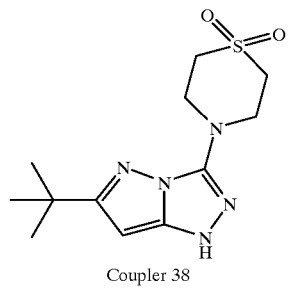
Coupler 38
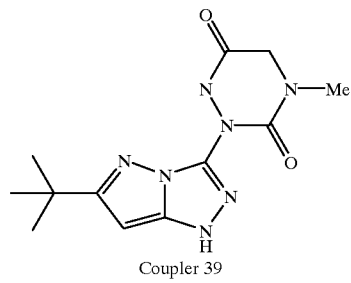
Coupler 39
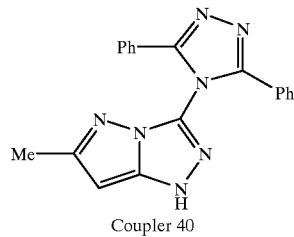
Coupler 40
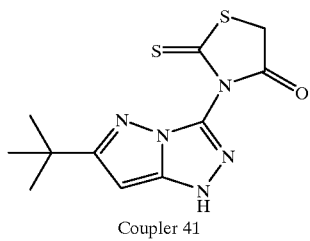
Coupler 41

-continued
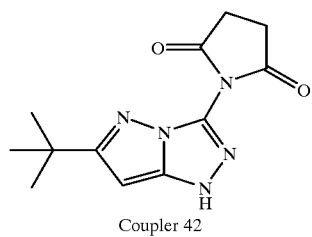
Coupler 42
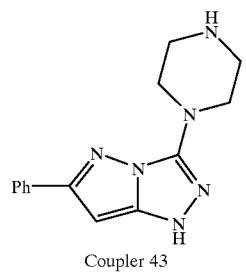
Coupler 43
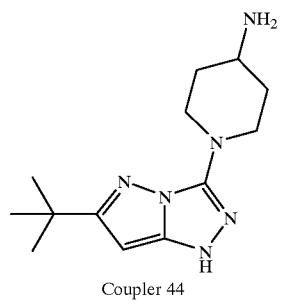
Coupler 44
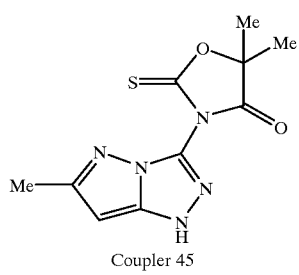
Coupler 45
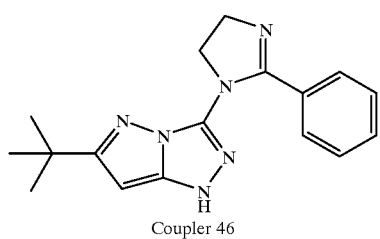
Coupler 46

-continued
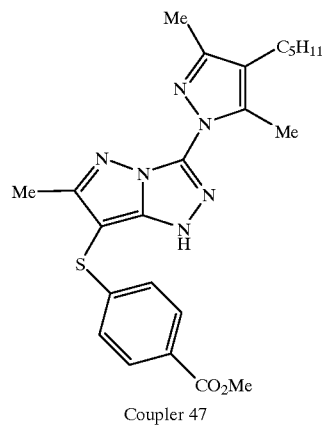
Coupler 47
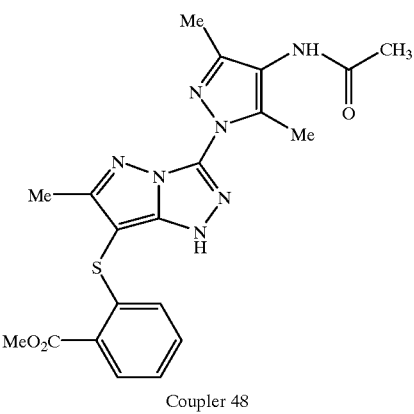
Coupler 48
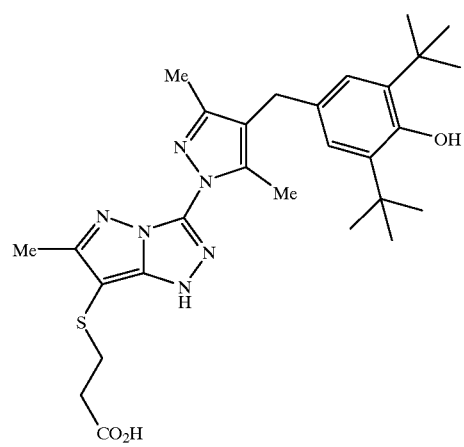
Coupler 49

-continued
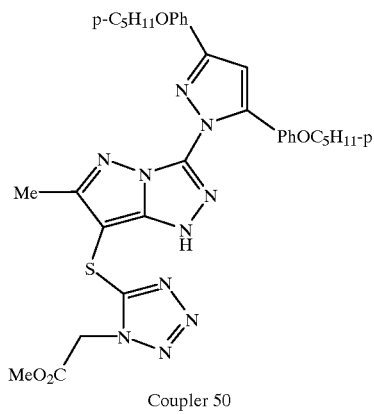
Coupler 50
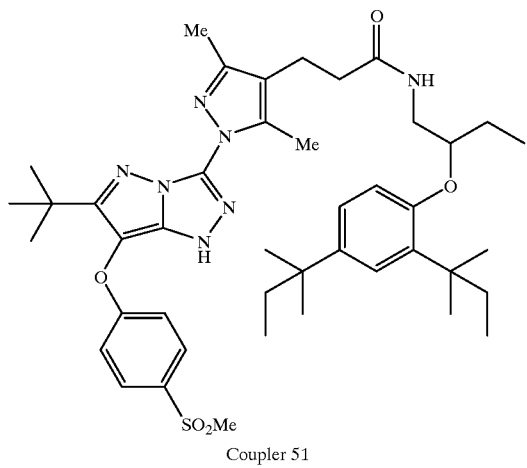
Coupler 51
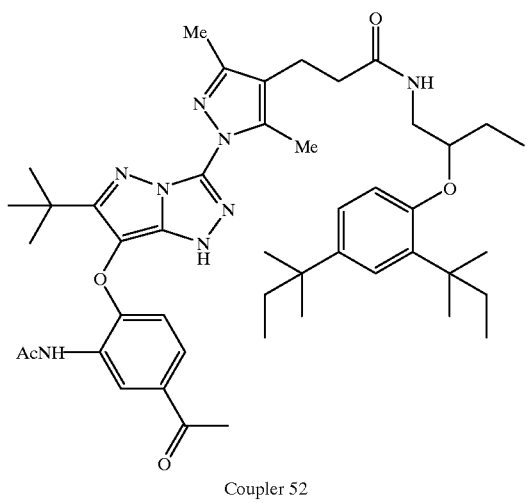
Coupler 52

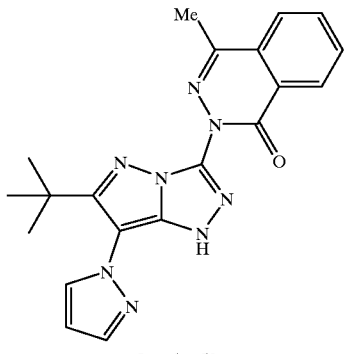

Coupler 53

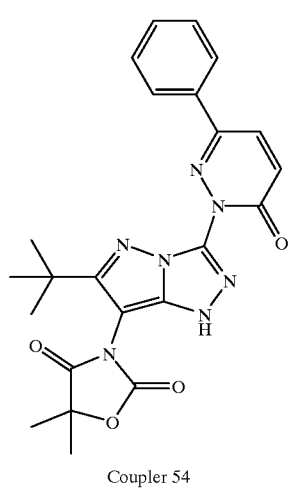

Coupler 54

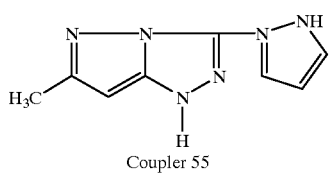

Coupler 55

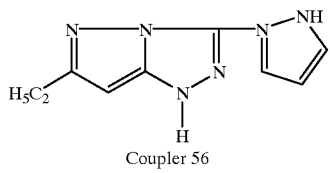

Coupler 56

The couplers of the present invention may be used as intermediates to prepare novel dyes. As described by Bailey in EP 1,253,933 such novel dyes may be useful in sensitized silver halide photographic materials as filter dyes or sensitizing dyes. Such dyes may also be useful as textile dyes and in more modern imaging applications such as a thermal dye transfer imaging processes and as inkjet dyes.

Most especially preferred dyes are the azomethine dyes of generic dye structure II below. These dyes are easily prepared by the reaction of oxidized primary aromatic amines with the novel pyrazolo[5,1-c]-1,2,4-triazole couplers of this invention. These new dyes have good extinction and high optical density with low unwanted absorbance at wavelengths of light which reduce the desirable hue of the dye. We have also found that the heterocyclic substituent at the 3 position of the pyrazolo[5,1-c]-1,2,4-triazole ring imparts a bathochromic shift to the absorbance maximum of the azomethine dyes relative to those pyrazolo[5,1-c]-1,2,4-triazole ring type dyes in which the 3 position is substituted with an alkyl substituent. It is important to point out that the heterocyclic ring in the 3 position of the pyrazolo[5,1-c]-1,2,4-triazole ring is retained intact after the reaction of oxidized primary aromatic amines with the novel pyrazolo [5,1-c]-1,2,4-triazole couplers of this invention and the heterocyclic ring at the 3 position of the pyrazolo[5,1-c]-1,2,4-triazole ring does not act as a coupling off group.

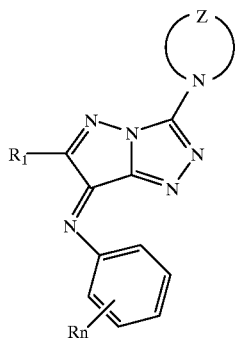

The novel dyes of structure II may be represented by the dyes bearing a 5 member or 6 member saturated or unsaturated heterocyclic ring attached to the 3 position of the pyrazolo[5,1-c]-1,2,4-triazole. The 5 member ring and the 6 member ring may be further substituted without limitations. The 5 member ring and the 6 member ring may also comprise a part of a larger multi-ring heterocyclic substituent on the 3 position of the pyrazolo[5,1-c]-1,2,4-triazole coupler. Examples of the 5 member or 6 member heterocyclic rings are described above for coupler structure I. The heterocyclic rings may further be substituted as described above for coupler structure I. The $R_1$ substituent of dye structure II is also described above for coupler structure I.

In the novel dye structure II the substituents Rn represents one or more substituents defining typical aminophenol and p-phenylenediamine derivatives which may include but are not limited by the following: o-aminophenol, p-aminophenol, 5-amino-2-hydroxytoluene, 2-amino-3-hydroxytoluene, 2-hydroxy-3-amino-1,4-dimethylbenzene, N,N-diethyl-p-phenylenediamine, 2-amino-5-diethylaminotoluene, 2-amino-5-(N-ethyl-N-laurylamino) toluene, 4-[N-ethyl-N-(beta-hydroxyethyl)amino]aniline, 2-methyl-4-[N-ethyl-N-(beta-hydroxyethyl)amino]aniline, 4-amino-3-methyl-N-ethyl-N-[beta-(methanesulfonamido) ethyl]aniline, N-(2-amino-5-diethylaminophenylethyl) methanesulfonamide, N,N-dimethyl-p-phenylenediamine monohydrochloride, 4-N,N-diethyl-2-methylphenylenediamine monohydrochloride, 4-(N-ethyl-N-2-methanesulfonylaminoethyl)-2-methylphenylenediamine sesquisulfate monohydrate, 4-(N-ethyl-N-2-hydroxyethyl)-2-methylphenylenediamine sulfate, 4-amino-3-methyl-N-ethyl-N-methoxyethylaniline, 4-amino-3-methyl-N-ethyl-N-beta-ethoxyethylaniline, 4-amino-3-methyl-N-ethyl-N-beta-butoxyethylaniline, and 4-N,N-diethyl-2,2'-methanesulfonylaminoethylphenylenediamine hydrochloride.

Particularly preferred are the p-phenylenediamines and especially the N,N-dialkyl-p-phenylenediamines in which the alkyl groups or the aromatic nucleus can be substituted or unsubstituted.

Hereunder, the typical examples of the azomethine dyes relating to the present invention will be given. However, the present invention shall not be limited thereto.

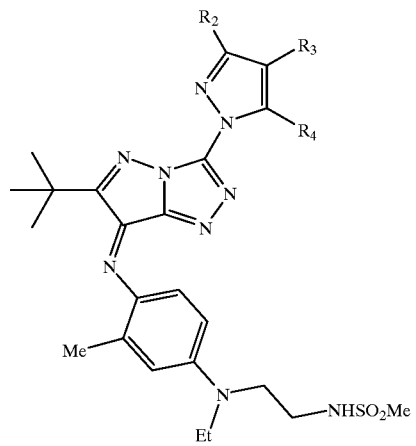

| Invention Dye | $R_2$ | $R_3$ | $R_4$ |
|---|---|---|---|
| 1 | Me | H | Me |
| 2 | n-Pr | H | n-Pr |
| 3 | Ph | H | Ph |
| 4 | t-Bu | H | t-Bu |
| 5 | β-Naphthyl | H | β-Naphthyl |
| 6 | Me | Ph | Me |
| 7 | Me | —$CH_2CH_2CO_2Et$ | Me |

-continued
| | | | |
|---|---|---|---|
| 8 | Me | 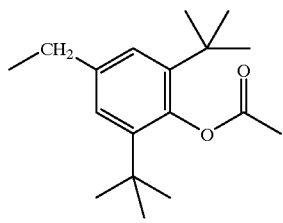 | Me |
| 9 | Me | —(CH$_2$)$_3$OH | Me |
| 10 | Me | —(CH$_2$)$_4$CH$_3$ | Me |
| 11 | H | H | Me |
| 12 | Me | —NHCOCH$_3$ | Me |
| 13 | Me | Me | Me |
| 14 | Me | —(CH$_2$)$_3$— | |
| 15 | Me | —(CH$_2$)$_4$— | |
| 16 | Me | —CH$_2$CH$_2$CN | Me |
| 17 | Me | —CONHPh | Me |
| 18 | Ph | OH | Ph |
| 19 | p-C$_5$H$_{11}$OPh— | H | p-C$_5$H$_{11}$OPh— |
| 20 | Me | 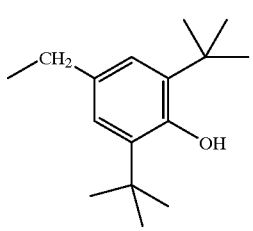 | Me |
| 21 | Me | Et | Me |
| 22 | Me | CN | Me |
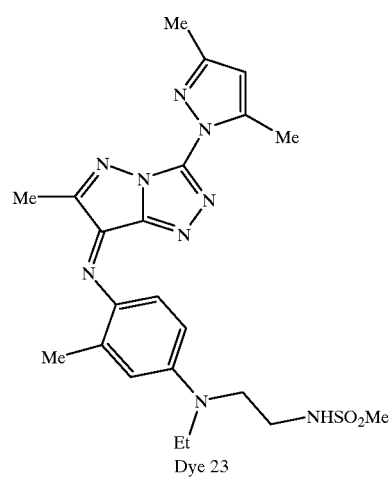
Dye 23

-continued
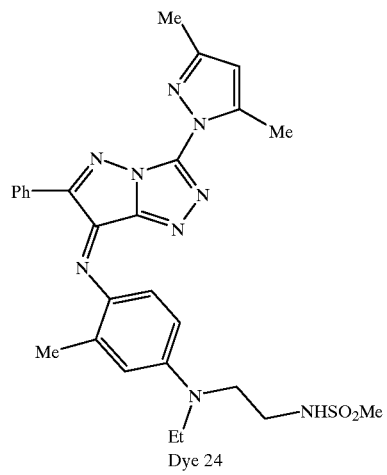
Dye 24
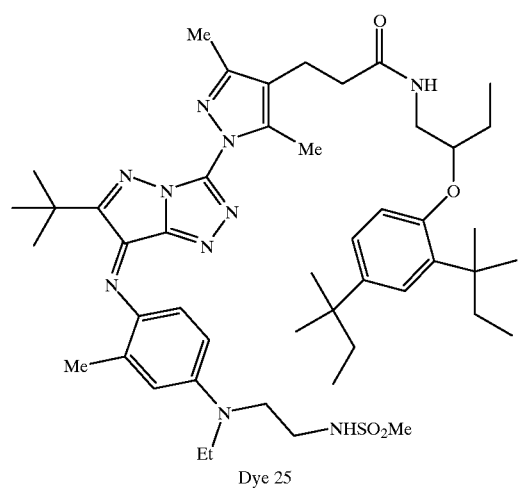
Dye 25
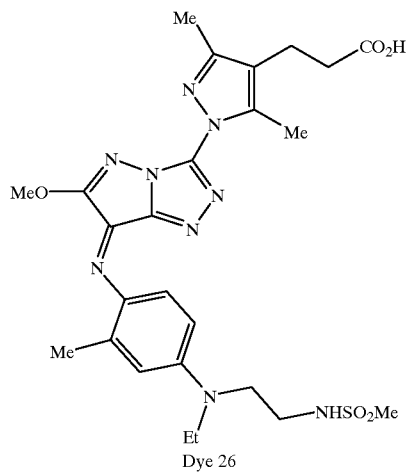
Dye 26

-continued
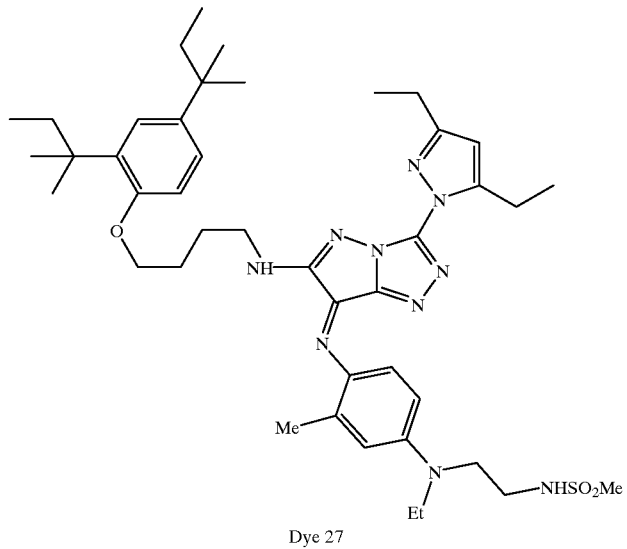
Dye 27
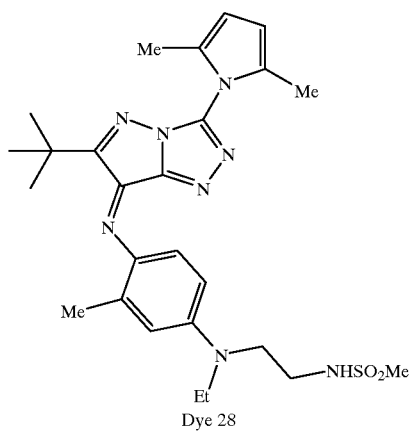
Dye 28
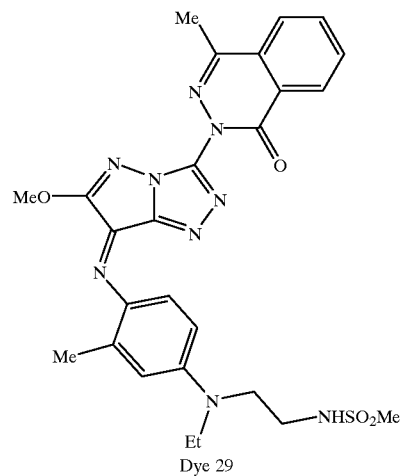
Dye 29

-continued
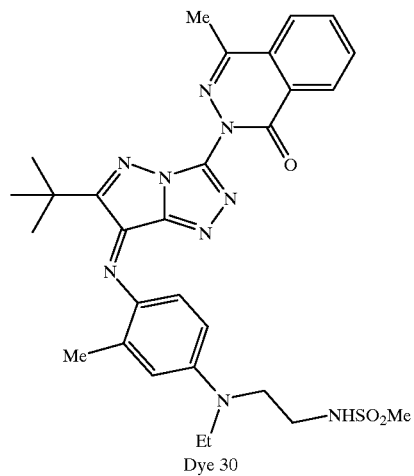
Dye 30
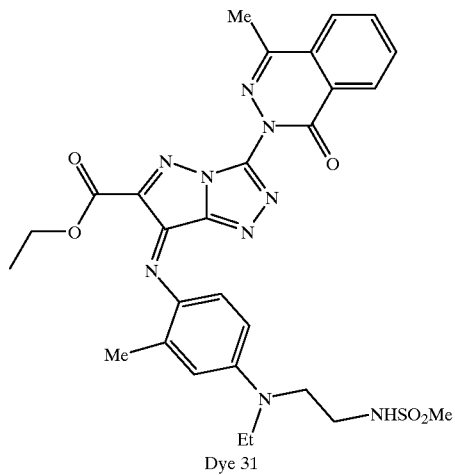
Dye 31
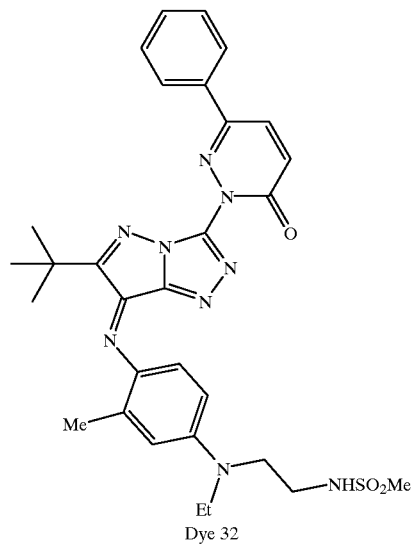
Dye 32

-continued
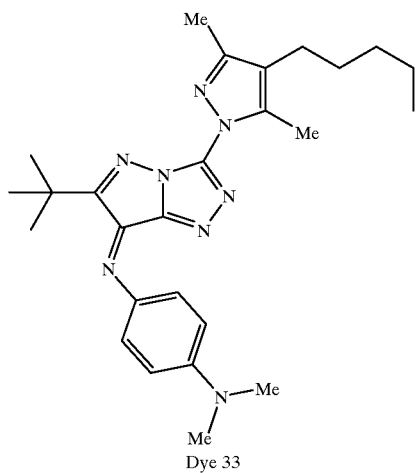
Dye 33
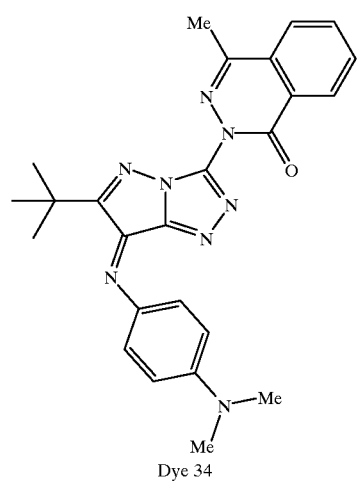
Dye 34
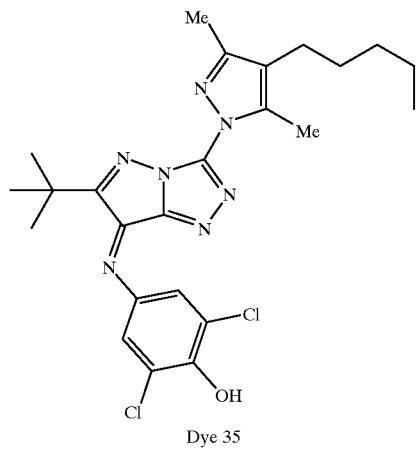
Dye 35

-continued
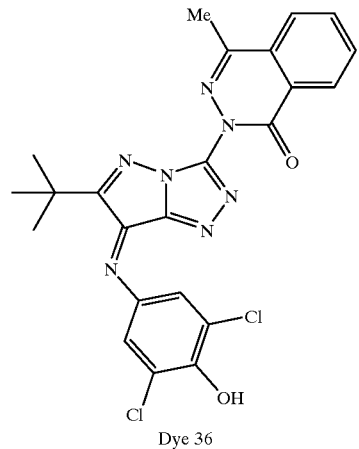
Dye 36
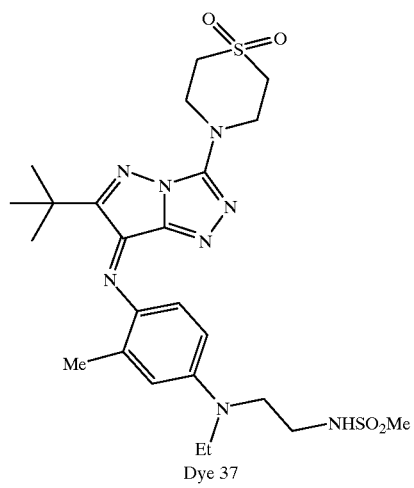
Dye 37
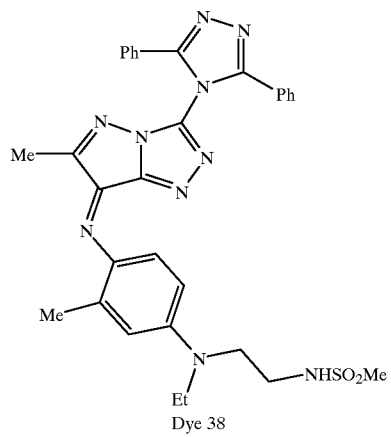
Dye 38

-continued

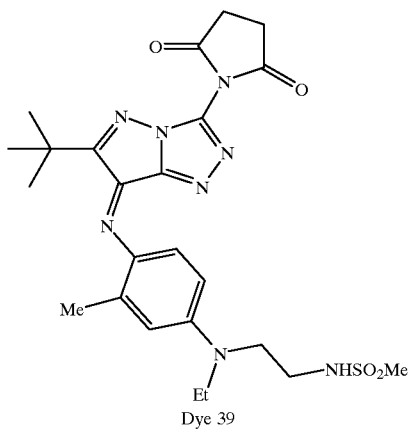

Dye 39

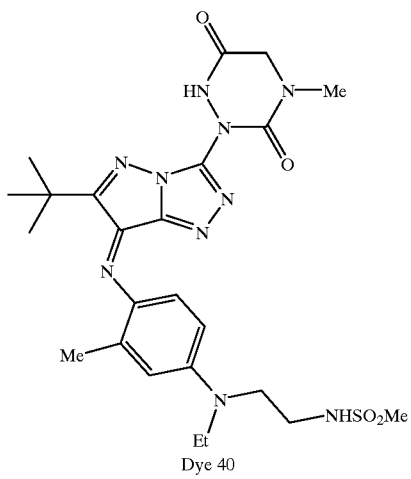

Dye 40

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for photographic utility. Suitably, a substituent group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl;

carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfonyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1-(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing or releasable groups, etc. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

The materials of the invention can be used in any of the ways and in any of the combinations known in the art. Typically, the invention materials are incorporated in a melt and coated as a layer described herein on a support to form part of a photographic element. When the term "associated" is employed, it signifies that a reactive compound is in or adjacent to a specified layer where, during processing, it is capable of reacting with other components.

To control the migration of various components, it may be desirable to include a high molecular weight hydrophobe or "ballast" group in coupler molecules. Representative ballast groups include substituted or unsubstituted alkyl or aryl groups containing 8 to 48 carbon atoms. Representative substituents on such groups include alkyl, aryl, alkoxy, aryloxy, alkylthio, hydroxy, halogen, alkoxycarbonyl, aryloxcarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents can also be further substituted.

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like.

If desired, the photographic element can be used in conjunction with an applied magnetic layer as described in *Research Disclosure,* November 1992, Item 34390 published by Kenneth Mason Publications, Ltd., Dudley Annex, 12a North Street, Emsworth, Hampshire P010 7DQ, ENGLAND, and as described in Hatsumi Kyoukai Koukai Gihou No. 94-6023, published Mar. 15, 1994, available from the Japanese Patent Office, the contents of which are incorporated herein by reference. When it is desired to employ the inventive materials in a small format film, *Research Disclosure, June* 1994, Item 36230, provides suitable embodiments.

In the following discussion of suitable materials for use in the emulsions and elements of this invention, reference will be made to *Research Disclosure,* September 1996, Item 38957, available as described above, which is referred to herein by the term "Research Disclosure". The contents of the Research Disclosure, including the patents and publications referenced therein, are incorporated herein by reference, and the Sections hereafter referred to are Sections of the Research Disclosure.

Except as provided, the silver halide emulsion containing elements employed in this invention can be either negative-working or positive-working as indicated by the type of processing instructions (i.e. color negative, reversal, or direct positive processing) provided with the element. Suitable emulsions and their preparation as well as methods of chemical and spectral sensitization are described in Sections I through V. Various additives such as UV dyes, brighteners, antifoggants, stabilizers, light absorbing and scattering materials, and physical property modifying addenda such as hardeners, coating aids, plasticizers, lubricants and matting agents are described, for example, in Sections II and VI through VIII. Color materials are described in Sections X through XIII. Suitable methods for incorporating couplers and dyes, including dispersions in organic solvents, are described in Section X(E). Scan facilitating is described in Section XIV. Supports, exposure, development systems, and processing methods and agents are described in Sections XV to XX. The information contained in the September 1994 *Research Disclosure,* Item No. 36544 referenced above, is updated in the September 1996 *Research Disclosure,* Item No. 38957. Certain desirable photographic elements and processing steps, including those useful in conjunction with color reflective prints, are described in *Research Disclosure,* Item 37038, February 1995.

Coupling-off groups are well known in the art. Such groups can determine the chemical equivalency of a coupler, i.e., whether it is a 2-equivalent or a 4-equivalent coupler, or modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction and the like.

The presence of hydrogen at the coupling site provides a 4-equivalent coupler, and the presence of another coupling-off group usually provides a 2-equivalent coupler. Representative classes of such coupling-off groups include, for example, chloro, alkoxy, aryloxy, hetero-oxy, sulfonyloxy, acyloxy, acyl, heterocyclyl, sulfonamido, mercaptotetrazole, benzothiazole, mercaptopropionic acid, phosphonyloxy, arylthio, and arylazo. These coupling-off groups are described in the art, for example, in U.S. Pat. Nos. 2,455,169, 3,227,551, 3,432,521, 3,476,563, 3,617,291, 3,880,661, 4,052,212 and 4,134,766; and in UK. Patents and published application Nos. 1,466,728, 1,531,927, 1,533,039, 2,006,755A and 2,017,704A, the disclosures of which are incorporated herein by reference.

Image dye-forming couplers may be included in the element such as couplers that form cyan dyes upon reaction with oxidized color developing agents which are described in such representative patents and publications as: "Farbkuppler-eine Literature Ubersicht," published in Agfa Mitteilungen, Band III, pp. 156–175 (1961) as well as in U.S. Pat. Nos. 2,367,531; 2,423,730; 2,474,293; 2,772,162; 2,895,826; 3,002,836; 3,034,892; 3,041,236; 4,333,999; 4,746,602; 4,753,871; 4,770,988; 4,775,616; 4,818,667; 4,818,672; 4,822,729; 4,839,267; 4,840,883; 4,849,328; 4,865,961; 4,873,183; 4,883,746; 4,900,656; 4,904,575; 4,916,051; 4,921,783; 4,923,791; 4,950,585; 4,971,898; 4,990,436; 4,996,139; 5,008,180; 5,015,565; 5,011,765; 5,011,766; 5,017,467; 5,045,442; 5,051,347; 5,061,613; 5,071,737; 5,075,207; 5,091,297; 5,094,938; 5,104,783; 5,178,993; 5,813,729; 5,187,057; 5,192,651; 5,200,305; 5,202,224; 5,206,130; 5,208,141; 5,210,011; 5,215,871; 5,223,386; 5,227,287; 5,256,526; 5,258,270; 5,272,051; 5,306,610; 5,326,682; 5,366,856; 5,378,596; 5,380,638; 5,382,502; 5,384,236; 5,397,691; 5,415,990; 5,434,034; 5,441,863; EPO 0 246 616; EPO 0 250 201; EPO 0 271 323; EPO 0 295 632; EPO 0 307 927; EPO 0 333 185; EPO 0 378 898; EPO 0 389 817; EPO 0 487 111; EPO 0 488 248; EPO 0 539 034; EPO 0 545 300; EPO 0 556 700; EPO 0 556 777; EPO 0 556 858; EPO 0 569 979; EPO 0 608 133; EPO 0 623 936; EPO 0 651 286; EPO 0 690 344; German OLS 4,026,903; German OLS 3,624,777. and Gennan OLS 3,823,049. Typically such couplers are phenols, naphthols, or pyrazoloazoles.

Couplers that form magenta dyes upon reaction with oxidized color developing agent are described in such representative patents and publications as: "Farbkuppler-eine Literature Ubersicht," published in Agfa Mitteilungen, Band III, pp. 126–156 (1961) as well as U.S. Pat. Nos. 2,311,082 and 2,369,489; 2,343,701; 2,600,788; 2,908,573; 3,062,653; 3,152,896; 3,519,429; 3,758,309; 3,935,015; 4,540,654; 4,745,052; 4,762,775; 4,791,052; 4,812,576; 4,835,094; 4,840,877; 4,845,022; 4,853,319; 4,868,099; 4,865,960; 4,871,652; 4,876,182; 4,892,805; 4,900,657; 4,910,124; 4,914,013; 4,921,968; 4,929,540; 4,933,465; 4,942,116; 4,942,117; 4,942,118; 4,959,480; 4,968,594; 4,988,614; 4,992,361; 5,002,864; 5,021,325; 5,066,575; 5,068,171; 5,071,739; 5,100,772; 5,110,942; 5,116,990; 5,118,812; 5,134,059; 5,155,016; 5,183,728; 5,234,805; 5,235,058; 5,250,400; 5,254,446; 5,262,292; 5,300,407; 5,302,496; 5,336,593; 5,350,667; 5,395,968; 5,354,826; 5,358,829; 5,368,998; 5,378,587; 5,409,808; 5,411,841; 5,418,123; 5,424,179; EPO 0 257 854; EPO 0 284 240; EPO 0 341 204; EPO 347,235; EPO 365,252; EPO 0 422 595; EPO 0 428 899; EPO 0 428 902; EPO 0 459 331; EPO 0 467 327; EPO 0 476 949; EPO 0 487 081; EPO 0 489 333; EPO 0 512 304; EPO 0 515 128; EPO 0 534 703; EPO 0 554 778; EPO 0 558 145; EPO 0 571 959; EPO 0 583 832; EPO 0 583 834; EPO 0 584 793; EPO 0 602 748; EPO 0 602 749; EPO 0 605 918; EPO 0 622 672; EPO 0 622 673; EPO 0 629 912; EPO 0 646 841, EPO 0 656 561; EPO 0 660 177; EPO 0 686 872; WO 90/10253; WO 92/09010; WO 92/10788; WO 92/12464; WO 93/01523; WO 93/02392; WO 93/02393; WO 93/07534; UK Application 2,244,053; Japanese Application 03192-350; German OLS 3,624,103; German OLS 3,912,265; and German OLS 40 08 067. Typically such couplers are pyrazolones, pyrazoloazoles, or pyrazolobenzimidazoles that form magenta dyes upon reaction with oxidized color developing agents.

Couplers that form yellow dyes upon reaction with oxidized color developing agent are described in such representative patents and publications as: "Farbkuppler-eine Literature Ubersicht," published in Agfa Mitteilungen; Band III; pp. 112–126 (1961); as well as U.S. Pat. Nos. 2,298,443; 2,407,210; 2,875,057; 3,048,194; 3,265,506; 3,447,928; 4,022,620; 4,443,536; 4,758,501; 4,791,050; 4,824,771; 4,824,773; 4,855,222; 4,978,605; 4,992,360; 4,994,361; 5,021,333; 5,053,325; 5,066,574; 5,066,576; 5,100,773; 5,118,599; 5,143,823; 5,187,055; 5,190,848; 5,213,958; 5,215,877; 5,215,878; 5,217,857; 5,219,716; 5,238,803; 5,283,166; 5,294,531; 5,306,609; 5,328,818; 5,336,591; 5,338,654; 5,358,835; 5,358,838; 5,360,713; 5,362,617; 5,382,506; 5,389,504; 5,399,474; 5,405,737; 5,411,848; 5,427,898; EPO 0 327 976; EPO 0 296 793; EPO 0 365 282; EPO 0 379 309; EPO 0 415 375; EPO 0 437 818; EPO 0 447 969; EPO 0 542 463; EPO 0 568 037; EPO 0 568 196; EPO 0 568 777; EPO 0 570 006; EPO 0 573 761; EPO 0 608 956; EPO 0 608 957; and EPO 0 628 865. Such couplers are typically open chain ketomethylene compounds.

Couplers that form colorless products upon reaction with oxidized color developing agent are described in such representative patents as: UK. 861,138; U.S. Pat. Nos. 3,632,345; 3,928,041; 3,958,993 and 3,961,959. Typically such couplers are cyclic carbonyl containing compounds that form colorless products on reaction with an oxidized color developing agent.

Couplers that form black dyes upon reaction with oxidized color developing agent are described in such representative patents as U.S. Pat. Nos. 1,939,231; 2,181,944; 2,333,106; and 4,126,461; German OLS No. 2,644,194 and German OLS No. 2,650,764. Typically, such couplers are resorcinols or m-aminophenols that form black or neutral products on reaction with oxidized color developing agent.

In addition to the foregoing, so-called "universal" or "washout" couplers may be employed. These couplers do not contribute to image dye-formation. Thus, for example, a naphthol having an unsubstituted carbamoyl or one substituted with a low molecular weight substituent at the 2- or 3-position may be employed. Couplers of this type are described, for example, in U.S. Pat. Nos. 5,026,628, 5,151,343, and 5,234,800.

It may be useful to use a combination of couplers any of which may contain known ballasts or coupling-off groups such as those described in U.S. Pat. No. 4,301,235; U.S. Pat. No. 4,853,319 and U.S. Pat. No. 4,351,897. The coupler may contain solubilizing groups such as described in U.S. Pat. No. 4,482,629. The coupler may also be used in association with "wrong" colored couplers (e.g. to adjust levels of interlayer correction) and, in color negative applications, with masking couplers such as those described in EP 213.490; Japanese Published Application 58-172,647; U.S. Pat. Nos. 2,983,608; 4,070,191; and 4,273,861; German Applications DE 2,706,117 and DE 2,643,965; UK. Patent 1,530,272; and Japanese Application 58-113935. The masking couplers may be shifted or blocked, if desired.

Typically, couplers are incorporated in a silver halide emulsion layer in a mole ratio to silver of 0.05 to 1.0 and generally 0.1 to 0.5. Usually the couplers are dispersed in a high-boiling organic solvent in a weight ratio of solvent to coupler of 0.1 to 10.0 and typically 0.1 to 2.0 although dispersions using no permanent coupler solvent are sometimes employed.

The invention materials may be used in association with materials that release Photographically Useful Groups (PUGS) that accelerate or otherwise modify the processing steps e.g. of bleaching or fixing to improve the quality of the image. Bleach accelerator releasing couplers such as those described in EP 193,389; EP 301,477; U.S. Pat. No. 4,163,669; U.S. Pat. No. 4,865,956; and U.S. Pat. No. 4,923,784, may be useful. Also contemplated is use of the compositions in association with nucleating agents, development accelerators or their precursors (UK Patent 2,097,140; UK. Patent 2,131,188); electron transfer agents (U.S. Pat. No. 4,859,578; U.S. Pat. No. 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The invention materials may also be used in combination with filter dye layers comprising colloidal silver sol or yellow, cyan, and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. No. 4,420,556; and U.S. Pat. No. 4,543,323.) Also, the compositions may be blocked or coated in protected form as described, for example, in Japanese Application 61/258,249 or U.S. Pat. No. 5,019,492.

The invention materials may further be used in combination with image-modifying compounds that release PUGS such as "Developer Inhibitor-Releasing" compounds (DIR's). DIR's useful in conjunction with the compositions of the invention are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

Such compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference. Generally, the developer inhibitor-releasing (DIR) couplers include a coupler moiety and an inhibitor coupling-off moiety (IN). The inhibitor-releasing couplers may be of the time-delayed type (DIAR couplers) which also include a timing moiety or chemical switch which produces a delayed release of inhibitor. Examples of typical inhibitor moieties are: oxazoles, thiazoles, diazoles, triazoles, oxadiazoles, thiadiazoles, oxathiazoles, thiatriazoles, benzotriazoles, tetrazoles, benzimidazoles, indazoles, isoindazoles, mercaptotetrazoles, selenotetrazoles, mercaptobenzothiazoles, selenobenzothiazoles, mercaptobenzoxazoles, selenobenzoxazoles, mercaptobenzimidazoles, selenobenzimidazoles, benzodiazoles, mercaptooxazoles, mercaptothiadiazoles, mercaptothiazoles, mercaptotriazoles, mercaptooxadiazoles, mercaptodiazoles, mercaptooxathiazoles, telleurotetrazoles or benzisodiazoles. In a preferred embodiment, the inhibitor moiety or group is selected from the following formulas:

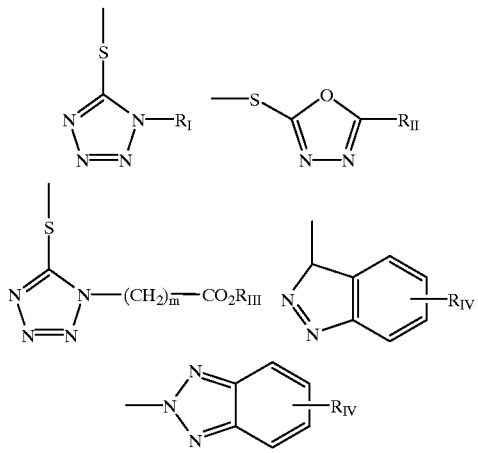

wherein $R_I$ is selected from the group consisting of straight and branched alkyls of from 1 to about 8 carbon atoms, benzyl, phenyl, and alkoxy groups and such groups containing none, one or more than one such substituent; $R_{II}$ is selected from $R_I$ and —$SR_I$; $R_{III}$ is a straight or branched alkyl group of from 1 to about 5 carbon atoms and m is from 1 to 3; and $R_{IV}$ is selected from the group consisting of hydrogen, halogens and alkoxy, phenyl and carbonamido groups, —$COOR_V$ and —$NHCOOR_V$ wherein $R_V$ is selected from substituted and unsubstituted alkyl and aryl groups.

Although it is typical that the coupler moiety included in the developer inhibitor-releasing coupler forms an image dye corresponding to the layer in which it is located, it may also form a different color as one associated with a different film layer. It may also be useful that the coupler moiety included in the developer inhibitor-releasing coupler forms colorless products and/or products that wash out of the photographic material during processing (so-called "universal" couplers).

A compound such as a coupler may release a PUG directly upon reaction of the compound during processing, or indirectly through a timing or linking group. A timing group produces the time-delayed release of the PUG such groups using an intramolecular nucleophilic substitution reaction (U.S. Pat. No. 4,248,962); groups utilizing an electron transfer reaction along a conjugated system (U.S. Pat. Nos. 4,409,323; 4,421,845; 4,861,701, Japanese Applications 57-188035; 58-98728; 58-209736; 58-209738); groups that function as a coupler or reducing agent after the coupler reaction (U.S. Pat. No. 4,438,193; U.S. Pat. No. 4,618,571) and groups that combine the features describe above. It is typical that the timing group is of one of the formulas:

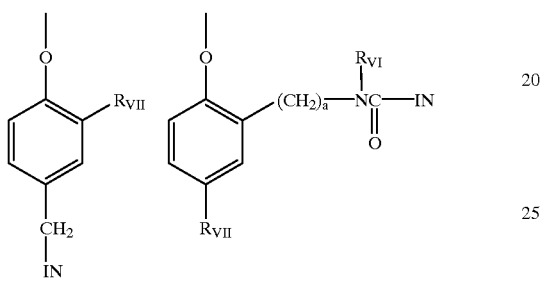

wherein IN is the inhibitor moiety, $R_{VII}$ is selected from the group consisting of nitro, cyano, alkylsulfonyl; sulfamoyl; and sulfonamido groups; a is 0 or 1; and $R_{VI}$ is selected from the group consisting of substituted and unsubstituted alkyl and phenyl groups. The oxygen atom of each timing group is bonded to the coupling-off position of the respective coupler moiety of the DIAR.

The timing or linking groups may also function by electron transfer down an unconjugated chain. Linking groups are known in the art under various names. Often they have been referred to as groups capable of utilizing a hemiacetal or iminoketal cleavage reaction or as groups capable of utilizing a cleavage reaction due to ester hydrolysis such as U.S. Pat. No. 4,546,073. This electron transfer down an unconjugated chain typically results in a relatively fast decomposition and the production of carbon dioxide, formaldehyde, or other low molecular weight by-products. The groups are exemplified in EP 464,612, EP 523,451, U.S. Pat. No. 4,146,396, Japanese Kokai 60-249148 and 60-249149.

Suitable developer inhibitor-releasing couplers for use in the present invention include, but are not limited to, the following:

D1

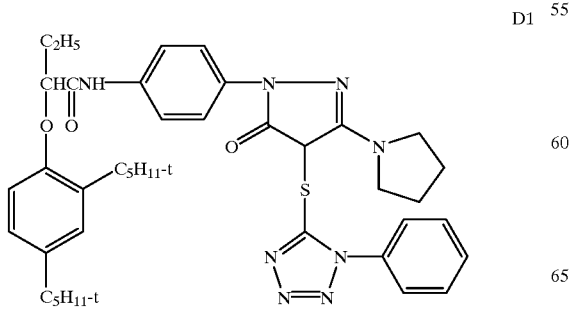

D2

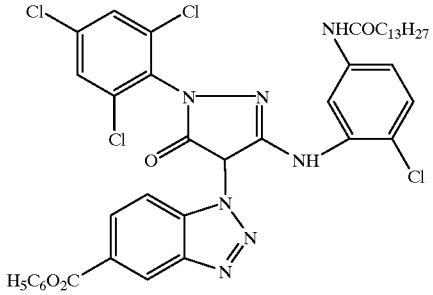

D3

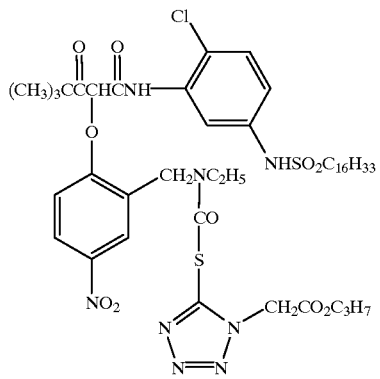

D4

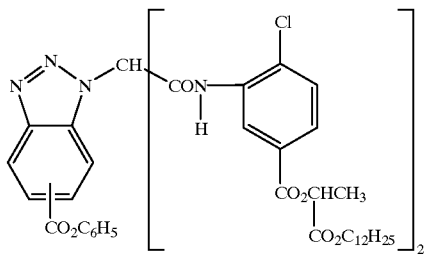

D5

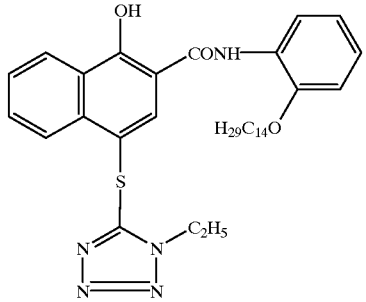

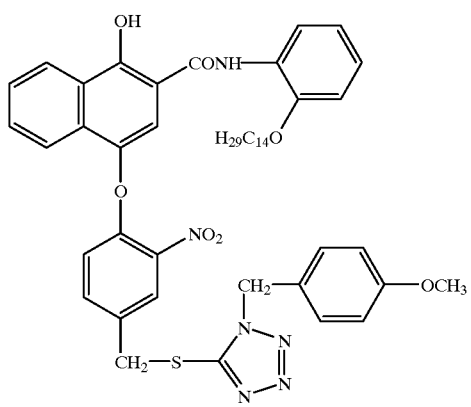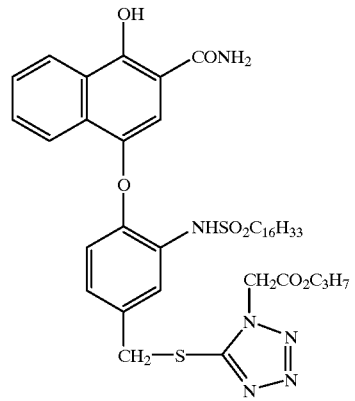

-continued

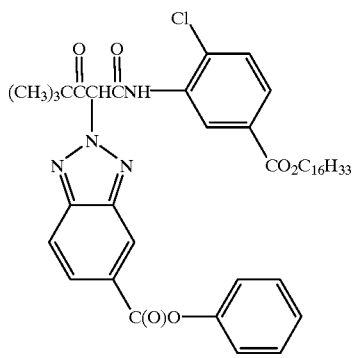

D12

It is also contemplated that the concepts of the present invention may be employed to obtain reflection color prints as described in *Research Disclosure*, November 1979, Item 18716, available from Kenneth Mason Publications, Ltd, Dudley Annex, 12a North Street, Emsworth, Hampshire P0101 7DQ, England, incorporated herein by reference. Materials of the invention may be coated on pH adjusted support as described in U.S. Pat. No. 4,917,994; on a support with reduced oxygen permeability (EP 553,339); with epoxy solvents (EP 164,961); with nickel complex stabilizers (U.S. Pat. No. 4,346,165; U.S. Pat. No. 4,540,653 and U.S. Pat. No. 4,906,559 for example); with ballasted chelating agents such as those in U.S. Pat. No. 4,994,359 to reduce sensitivity to polyvalent cations such as calcium; and with stain reducing compounds such as described in U.S. Pat. No. 5,068,171. Other compounds useful in combination with the invention are disclosed in Japanese Published Applications described in Derwent Abstracts having accession numbers as follows: 90-072,629; 90-072,630; 90-072,631; 90-072,632; 90-072,633; 90-072,634; 90-077,822; 90-078,229; 90-078,230; 90-079,336; 90-079,337; 90-079,338; 90-079,690; 90-079,691; 90-080,487; 90-080,488; 90-080,489; 90-080,490; 90-080,491; 90-080,492; 90-080,494; 90-085,928; 90-086,669; 90-086,670; 90-087,360; 90-087,361; 90-087,362; 90-087,363; 90-087,364; 90-088,097; 90-093,662; 90-093,663; 90-093,664; 90-093,665; 90-093,666; 90-093,668; 90-094,055; 90-094,056; 90-103,409; 83-62,586; 83-09,959.

Conventional radiation-sensitive silver halide emulsions can be employed in the practice of this invention. Such emulsions are illustrated by *Research Disclosure*, Item 38755, September 1996, I. Emulsion grains and their preparation.

Especially useful in this invention are tabular grain silver halide emulsions. Tabular grains are those having two parallel major crystal faces and having an aspect ratio of at least 2. The term "aspect ratio" is the ratio of the equivalent circular diameter (ECD) of a grain major face divided by its thickness (t). Tabular grain emulsions are those in which the tabular grains account for at least 50 percent (preferably at least 70 percent and optimally at least 90 percent) of the total grain projected area. Preferred tabular grain emulsions are those in which the average thickness of the tabular grains is less than 0.3 micrometer (preferably thin—that is, less than 0.2 micrometer and most preferably ultrathin—that is, less than 0.07 micrometer). The major faces of the tabular grains can lie in either {111} or {100} crystal planes. The mean ECD of tabular grain emulsions rarely exceeds 10 micrometers and more typically is less than 5 micrometers.

In their most widely used form tabular grain emulsions are high bromide {111} tabular grain emulsions. Such emulsions are illustrated by Kofron et al U.S. Pat. No. 4,439,520, Wilgus et al U.S. Pat. No. 4,434,226, Solberg et al U.S. Pat. No. 4,433,048, Maskasky U.S. Pat. Nos. 4,435,501, 4,463,087 and 4,173,320, Daubendiek et al U.S. Pat. Nos. 4,414,310 and 4,914,014, Sowinski et al U.S. Pat. No. 4,656,122, Piggin et al U.S. Pat. Nos. 5,061,616 and 5,061,609, Tsaur et al U.S. Pat. Nos. 5,147,771, '772, '773, 5,171,659 and 5,252,453, Black et al U.S. Pat. Nos. 5,219,720 and 5,334,495, Delton U.S. Pat. Nos. 5,310,644, 5,372,927 and 5,460,934, Wen U.S. Pat. No. 5,470,698, Fenton et al U.S. Pat. No. 5,476,760, Eshelman et al U.S. Pat. Nos. 5,612,,175 and 5,614,359, and Irving et al U.S. Pat. No. 5,667,954.

Ultrathin high bromide {111} tabular grain emulsions are illustrated by Daubendiek et al U.S. Pat. Nos. 4,672,027, 4,693,964, 5,494,789, 5,503,971 and 5,576,168, Antoniades et al U.S. Pat. No. 5,250,403, Olm et al U.S. Pat. No. 5,503,970, Deaton et al U.S. Pat. No. 5,582,965, and Maskasky U.S. Pat. No. 5,667,955.

High bromide {100} tabular grain emulsions are illustrated by Mignot U.S. Pat. Nos. 4,386,156 and 5,386,156.

High chloride { 111 } tabular grain emulsions are illustrated by Wey U.S. Pat. No. 4,399,215, Wey et al U.S. Pat. No. 4,414,306, Maskasky U.S. Pat. Nos. 4,400,463, 4,713,323, 5,061,617, 5,178,997, 5,183,732, 5,185,239, 5,399,478 and 5,411,852, and Maskasky et al U.S. Pat. Nos. 5,176,992 and 5,178,998. Ultrathin high chloride {111} tabular grain emulsions are illustrated by Maskasky U.S. Pat. Nos. 5,271,858 and 5,389,509.

High chloride {100} tabular grain emulsions are illustrated by Maskasky U.S. Pat. Nos. 5,264,337, 5,292,632, 5,275,930 and 5,399,477, House et al U.S. Pat. No. 5,320,938, Brust et al U.S. Pat. No. 5,314,798, Szajewski et al U.S. Pat. No. 5,356,764, Chang et al U.S. Pat. Nos. 5,413,904 and 5,663,041, Oyarnada U.S. Pat. No. 5,593,821, Yamashita et al U.S. Pat. Nos. 5,641,620 and 5,652,088, Saitou et al U.S. Pat. No. 5,652,089, and Oyamada et al U.S. Pat. No. 5,665,530. Ultrathin high chloride {100} tabular grain emulsions can be prepared by nucleation in the presence of iodide, following the teaching of House et al and Chang et al, cited above.

The emulsions can be surface-sensitive emulsions, i.e., emulsions that form latent images primarily on the surfaces of the silver halide grains, or the emulsions can form internal latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent. Tabular grain emulsions of the latter type are illustrated by Evans et al. U.S. Pat. No. 4,504,570.

Photographic elements can be exposed to actinic radiation, typically in the visible region of the spectrum, to form a latent image and can then be processed to form a visible dye image. Processing to form a visible dye image includes the step of contacting the element with a color developing agent to reduce developable silver halide and oxidize the color developing agent. Oxidized color developing agent in turn reacts with the coupler to yield a dye. If desired "Redox Amplification" as described in Research Disclosure XVIIIB(5) may be used.

With negative-working silver halide, the processing step described above provides a negative image. One type of such element, referred to as a color negative film, is designed for image capture. Speed (the sensitivity of the element to low light conditions) is usually critical to obtaining sufficient image in such elements. Such elements are typically silver bromoiodide emulsions coated on a transparent support and are sold packaged with instructions to process in known color negative processes such as the Kodak C-41 process as described in The British Journal of Photography Annual of 1988, pages 191–198. If a color negative film element is to be subsequently employed to generate a viewable projection print as for a motion picture, a process such as the Kodak ECN-2 process described in the H-24 Manual available from Eastman Kodak Co. may be employed to provide the color negative image on a transparent support. Color negative development times are typically 3' 15" or less and desirably 90 or even 60 seconds or less.

The photographic element of the invention can be incorporated into exposure structures intended for repeated use or exposure structures intended for limited use, variously referred to by names such as "single use cameras", "lens with film", or "photosensitive material package units".

Another type of color negative element is a color print. Such an element is designed to receive an image optically printed from an image capture color negative element. A color print element may be provided on a reflective support for reflective viewing (e.g. a snap shot) or on a transparent support for projection viewing as in a motion picture. Elements destined for color reflection prints are provided on a reflective support, typically paper, employ silver chloride emulsions, and may be optically printed using the so-called negative-positive process where the element is exposed to light through a color negative film which has been processed as described above. The element is sold packaged with instructions to process using a color negative optical printing process, for example the Kodak RA-4 process, as generally described in PCT WO 87/04534 or U.S. Pat. No. 4,975,357, to form a positive image. Color projection prints may be processed, for example, in accordance with the Kodak ECP-2 process as described in the H-24 Manual. Color print development times are typically 90 seconds or less and desirably 45 or even 30 seconds or less.

A reversal element is capable of forming a positive image without optical printing. To provide a positive (or reversal) image, the color development step is preceded by development with a non-chromogenic developing agent to develop exposed silver halide, but not form dye, and followed by uniformly fogging the element to render unexposed silver halide developable. Such reversal elements are typically sold packaged with instructions to process using a color reversal process such as the Kodak E-6 process as described in The British Journal of Photography Annual of 1988, page 194. Alternatively, a direct positive emulsion can be employed to obtain a positive image.

The above elements are typically sold with instructions to process using the appropriate method such as the mentioned color negative (Kodak C-41), color print (Kodak RA-4), or reversal (Kodak E-6) process.

Preferred color developing agents are p-phenylenediamines such as:
4-amino-N,N-diethylaniline hydrochloride,
4-amino-3-methyl-N,N-diethylaniline hydrochloride,
4-amino-3-methyl-N-ethyl-N-(2-methanesulfonamidoethyl)aniline sesquisulfate hydrate,
4-amino-3-methyl-N-ethyl-N-(2-hydroxyethyl)aniline sulfate,
4-amino-3-(2-methanesulfonamidoethyl)-N,N-diethylaniline hydrochloride, and
4-amino-N-ethyl-N-(2-methoxyethyl)-m-toluidine di-p-toluene sulfonic acid.

Color developers often include hydroxylanine or hydroxylanine derivatives as antioxidants. Some useful antioxidants include monoalkyl and dialkylhydroxylanines such as those having carboxy, hydroxy, sulfo, phospho, sulfonamido and carbonamido substitutents on one or more alkyl groups.

Development is usually followed by the conventional steps of bleaching, fixing, or bleach-fixing, to remove silver or silver halide, washing, and drying.

The entire contents of the patents and other publications referred to in this specification are incorporated herein by reference.

Synthetic intermediaries, and their preparation methods are described in the following patent applications and patents: FR 2 075 583, EP-A-1 19 860, EP-A-285 274, EP-A-244 160, EP-A-578 248, GB 1458 377, U.S. Pat. No. 3,227,554, U.S. Pat. No. 3,419,391, U.S. Pat. No. 3,061,432, U.S. Pat. No. 4,500,630, U.S. Pat. No. 3,725,067, U.S. Pat. No. 3,926,631, U.S. Pat. No. 5,457,210, JP 84/99437, JP 83/42045, JP 84/162548, JP 841171956, JP 85/33552, JP 85/436599 JP 85/172982, JP 85/190779, as well as in the following publications: Chem. Ber. 32 797 (1899), Chem. Ber.89, 2550 (1956), J. Chem. Soc. Perkin trans I, 2047, (1977), J. Prakt. Chem., 320, 533, (1978), and J. fur Chem., 326 (5), 829, (1984).

Concerning colorant formulation uses:

Certain compounds within formula I are preferred for colorant, especially hair colorant formulations. It is understood that they may be added as such or as an acid salt of the compound. Desirable are a 5- or 6-membered ring that is selected from the group consisting of phthalazine, phthalimide, pyrazole, pyrazolidine, pyrazolinone, pyrimidine, pyrrole, pyrrolidine, and pyrroline groups and particularly pyrrole and pyrazole groups. Suitably, in compound I, the total number of carbon atoms contained in $R_1+Z$ is 14 or less, desirably 10 or less, and typically 6 or less. The molecular weight of the compound, excluding X, is 300 or less, suitable 275 or less and typically 250 or less. Compound I may be added as one or more acid salts such as hydrochlorides, hydrobromides, sulfides, tartrates, benzenesulfonates, lactates, tosylates and acetates.

The colorant formulation comprises the compound of formula (I), an oxidation base, and a suitable medium for dyeing. The compound having formula I represents 0.0005–12, and desirably 0.005–6 wt % of the total weight of the dye formulation, exclusive of any acid salt.

The nature of the oxidation base(s) which can be used in the dye formulation according to the invention is not critical. The oxidation base is typically selected from para-phenylenediamine, bisphenylalkylenediamine, para-aminophenol, ortho-aminophenol, and heterocyclic base groups, including their acid addition salts. The formulation contains, as a suitable medium for dyeing, water or a mixture of water and at least one organic solvent, such as C1–C4 alcohols, glycerol, glycols and glycol others, and aromatic alcohols.

The formulation may contain, in addition, one or more additional couplers which are different from the compounds having formula I and/or one or more dyes. The formulation desirably exhibits a pH value of 3–12 and may be in any suitable form such as a liquid, cream, gel, or foam.

The method for oxidation dyeing of keratin fibers comprises contacting the fibers with at least one dye formulation and an oxidizing agent such as hydrogen peroxide, urea peroxide, alkali metal bromates, and per-salts.

A device with several compartments, or dye "kit" with several compartments, where the first compartment contains a dye composition as defined and the second compartment contains an oxidizing composition may be employed for practicing the method.

Among the para-phenylenediamines that can be used as oxidation bases in the dye composition according to the invention, one can particularly cite the compounds having the following formula (II), and their acid addition -salts:

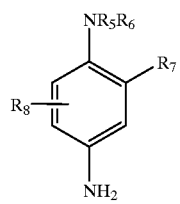

(II)

in which:

R5 represents a hydrogen atom, a C1–C4 alkyl radical, a C1–C4 monohydroxyallW1 radical, a C2–C4 polyhydroxyalkyl radical, or a (C1–C4) alkoxyl (C1–C4) alkyl radical, R6 represents a hydrogen atom, a C1–C4 alkyl, a C1–C4 monohydroxyalkyl, or C2–C4 polyhydroxyalkyl, R7 represents a hydrogen atom, a halogen atom such as a chlorine atom, a C1–C4 alkyl, a carboxy, a C1–C4 monohydroxyalkyl, or a C1–C4 hydroxyalkoxy radical, R8 represents a hydrogen atom or a C1–C4 alkyl radical.

In the above formula (II), when R-1 is different from a hydrogen atom, then R5 and R6 preferably represent a hydrogen atom, and R7 is preferably identical to R6, and when R7 represents a halogen atom, then R5, R6 and R8 preferably represent a hydrogen atom.

Among the para-phenylenediamines having the above formula (II), one can cite, in particular, para-phenylenediamine, para-toluenediamine, 2-isopropyl-para-phenylenediamine, 2-β-hydroxyethyl-para-phenylenediamine, 2-β-hydroxyethyloxy-para-phenyltenediamine, 2,6-dimethyl-para-phenylenediamine, 2,6-diethyl-para-phenylenediamine, 2,3-dimethyl-para-phenylenediamine, N-bis(β-hydroxyethyl)-para-phenylenediamine, 4-amino4-(β-methoxyethyl) aminobenzene, 2-chloro-para-phenylenediamine, and their acid addition salts.

Among the other oxidation base types, those specified in WO97/35551 may be suitably employed.

According to the invention, the oxidation base(s) represent(s) preferably approximately 0.0005–12 wt % of the total weight of the dye composition, and even more advantageously approximately 0.005–6 wt % of this weight.

The dye composition according to the invention can also comprise one or more additional couplers which are different from the compounds having formula (I) and/or one or more direct dyes so as to vary or enrich the reflections of the hues obtained with the oxidation bases.

The additional couplers that can be used in the composition according to the invention can be chosen from the couplers conventionally used in oxidation dyeing, and among those one can particularly cite the meta-phenylenediamines, the meta-aminophenols, the meta-diphenols, and the heterocyclic couplers such as, for example, the indole derivatives, the indoline derivatives, and their acid addition salts.

These couplers can particularly be chosen from 2-methyl-5-aminophanol, 5-N-(P-hydroxyethyl)amino-2-mothylphenol, 3-aminophenol, 1,3-dihydroxybenzene, 1,3-dihydroxy-2-methylbenzene, 4-chloro-1,3-dihydroxybenzene, 2,4-diamino-1-(P-hydroxyethyloxy) benzene, 2-amino4-(A-hydroxyethylamino)4-methoxybenzene, 1,3-diaminobenzene, 1,3-bis(2,4-diaminophenoxy)propane, sesamol, a-naphthol, 6-hydroxyindole, 4-hydroxyindole, 4-hydrox5NN-methylindole, 6-hydroxyindoline, and their acid addition salts.

When present, these additional couplers preferably represent approximately 0.0005–5 wt % of the total weight of the dye composition, and even more advantageously approximately 0.005–3 wt % of this weight.

The acid addition salts of the oxidation base(s), and/or of the additional couplers that can be used in the dye composition of the invention, are particularly chosen from the hydrochlorides, the hydrobromides, the sulfates and the tartrates, the lactates and the acetates.

The appropriate medium for the dyeing (or the support) generally consists of water or a mixture of water and at least one organic solvent to solubilize the compounds that would not be sufficiently soluble in water. As an organic solvent, one can cite, for example, the lower C1–C4 alcohols such as ethanol or isopropanol; glycerol; glycols and glycol ethers, such as 2-butoxyethanol, propylene glycol, propylene glycol monomethyl ether, diethylene glycol monoethyl ether and monomethyl ether, as well as the aromatic alcohols, such as benzyl alcohol or phenoxyethanol, similar products and mixtures thereof The solvents can be present in proportions which are suitably 1–40 wt % with reference to the total weight of the dye composition, and even more advantageously 5–30 wt %.

The pH of the dye composition according to the invention is generally 3–12. It can be adjusted to the desired value by means of the conventionally used acidifying or alkalizing agents used in the dyeing of keratin fibers.

Among the acidifying agents, one can cite, as examples, the mineral or organic acids, such as hydrochloric acid, orthophosphoric acid, the carboxylic acids, such as tartaric acid, citric acid, lactic acid, and the sulfonic acids.

Among the alkalizing agents, one can cite, as examples, ammonia alkaline carbonates, the alkanolamines, such as mono-, di- and triethanolamines, as well as derivatives thereof the sodium or potassium hydroxides.

The dye composition according to the invention can also comprise various adjuvants that are conventionally used in the compositions for dyeing hair, such as anionic, cationic, nonionic, amphoteric, zwitterionic, surfactants, or mixtures thereof, anionic, cationic, nonionic, amphoteric, or zwitterionic polymers, or mixtures thereof, mineral or organic thickeners, antioxidants, penetrating agents, sequestering agents, perfumes, buffers, dispersants, conditioning agents, such as, for example, silicones, film-forming agents, preservatives, and opacifiers.

The dye composition according to the invention can be in various forms, such as in the form of liquids, creams, gel, foam or in any other appropriate form to carry out the dyeing of keratin fibers, particularly human hair.

The invention also relates to the utilization of pyrazoloazoles (including salts thereof) having the above formula (I), as a coupler, in association with at least one oxidation base for oxidation dyeing of keratin fibers, particularly human keratin fibers, such as hair.

Another object of the invention is a method for oxidation dyeing of keratin fibers, particularly human keratin fibers, such as hair, which uses the dye formulation as defined above.

According to this method, one applies to the fibers at least one dye formulation as defined above, the color being revealed at acid, neutral or alkaline pH by means of an oxidizing agent which is added just before the use of the dye composition, or which is present in an oxidizing composition which is applied simultaneously, or sequentially in a separate manner.

According to one embodiment of the dyeing method of the invention which is particularly preferred, one mixes, at the time of use, the above-described dye composition with an oxidizing composition containing, in a medium appropriate for dyeing, at least one oxidizing agent present in a sufficient quantity to develop a dyeing. The mixture obtained is then applied to the keratin fibers and allowed to set for approximately 3–50 min, preferably approximately 5–30 min, and after that a rinsing step is carried out, followed by washing with shampoo, and then again rinsing, and drying.

The oxidizing agent present in the oxidizing composition as defined above can be chosen from the oxidizing agents conventionally used for oxidation dyeing of keratin fibers, among which one can cite hydrogen peroxide, urea peroxide, bromates of alkali metals, the persalts such as the perborates and persulfates. Hydrogen peroxide is particularly preferred.

The pH of the oxidizing composition containing the oxidizing agent as defined above is such that after the mixing with the dye composition, the pH of the resulting composition applied to the keratin fibers preferably varies between approximately 3 and 12, and more advantageously between 5 and 11. It is adjusted to the desired value by means of acidifying or alkalizing agents conventionally used in the dyeing of keratin fibers, and as defined above.

The oxidizing composition as defined above can also contain various adjuvants conventionally used in the compositions for dyeing hair, and as defined above.

Another object of the invention is a device with several compartments or a dyeing "kit" or any other packaging system with several compartments, where a first compartment comprises the dye composition as defined above and the second compartment contains the oxidizing composition as defined above.

These devices can be equipped with a means to deliver the desired mixture to the hair, such as the devices listed in French Patent No. FR-2 586 913 in the name of the applicant.

Couplers of the present invention can be prepared by simple reactions and methods described below. Typical syntheses are illustrated by the following examples.

General Methods of Coupler Synthesis

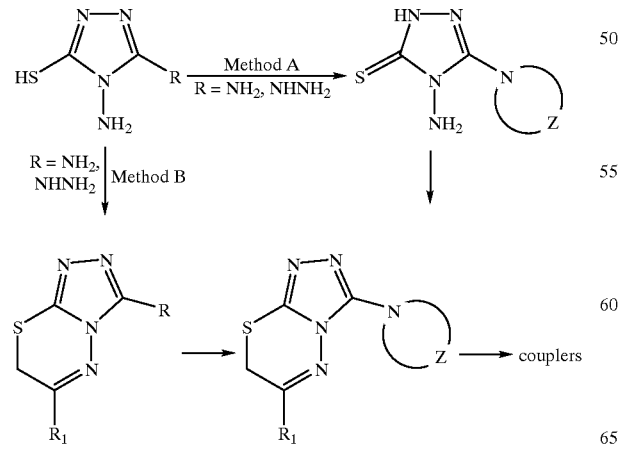

Example 1

Synthesis of Coupler 19, Method A

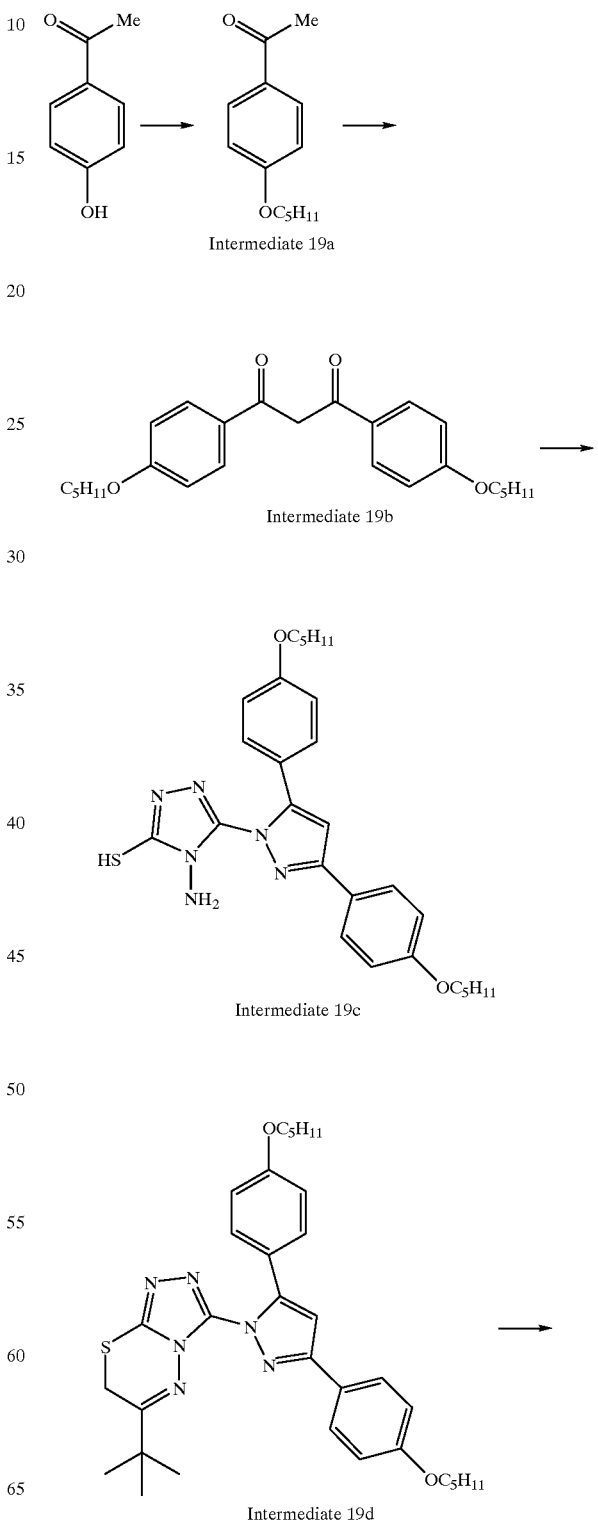

-continued

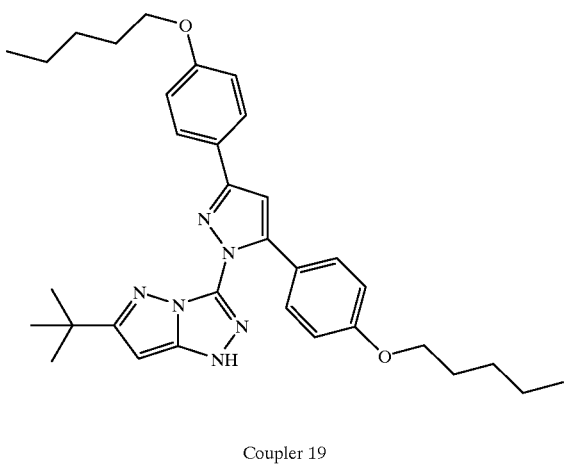

Coupler 19

4'-Pentoxyacetophenone, Intermediate-19a.

Into a 500 ml single neck round bottom flask was placed 300 ml of acetone, 46 grams (0.33 moles) of potassium carbonate, 35 grams (0.26 moles) of 4'-hydroxyacetophenone, and 40 grams (0.26 moles) of 1-bromopentane. The reaction was brought to reflux and held at reflux for 24 hours with stirring. After this time, an additional 5 ml of 1-bromopentane and 5 grams of potassium carbonate were added and the reflux was continued for an additional 24 hours. The reaction was cooled to room temperature and the precipitated potassium bromide was filtered off. The filtrate was concentrated to near dryness under vacuum and the residue dissolved in 200 ml ethyl acetate. After extraction three times with 150 ml of water the organic phase was dried over magnesium sulfate, filtered, and concentrated to dryness to afford 53.8 grams (0.26 moles, 100% yield) of product. Pure by proton and carbon NMR; MS: [MH]+=207 m/e.

1,3-Bis[4-(pentyloxy)phenyl]-1,3-propanedione, Intermediate-19b.

Into a 250 ml three neck round bottom flask was placed 7.0 grams (175 mmoles) of sodium hydride (60% dispersion in oil) and 35 ml of ethylene glycol dimethyl ether. With stirring and under nitrogen was added dropwise a solution of 10.3 grams (50 mmoles) of Intermediate-19a and 11.1 grams (50 mmoles) of methyl 4-pentoxybenzoate (commercially available from Esprit Chemical Company) dissolved in 50 ml of ethylene glycol dimethyl ether. The reaction was heated to reflux for 2 hours then held at 50° C. for 5 hours. After cooling to room temperature the excess sodium hydride was destroyed with methanol and the reaction was cooled to 0° C. with an ice water bath. The reaction was neutralized with aqueous acetic acid and the yellow solid was collected by filtration and washed twice with 100 ml of water. The light yellow material was dried under vacuum overnight to afford 18.2 grams (46 mmoles, 92% yield) of product which was used without further purification. MS: [MH]+=397 m/e.

4-Amino-2,4-dihydro-5-(3,5-bis[4-(pentyloxy)phenyl]- 1 H-pyrazol-1 -yl)-3H-1,2,4-triazole-3-thione, Intermediate-19c.

Into a 1 liter three neck round bottom flask was placed 10 grams (68.5 mmoles) of Purpald (Aldrich Chemical Company), 200 ml of ethanol and 25 ml of concentrated hydrochloric acid. The mixture was brought to reflux with stirring and 60 ml of water was added. To the hot reaction mixture was added 40.8 grams (103 mmoles) of Intermediate-19b. The reaction was refluxed overnight then cooled to room temperature with an ice water bath. The resultant yellow precipitated product was collected by filtration then dissolved in 500 ml of ethyl acetate. After extraction three times with 100 ml of water, the organic layer was dried over magnesium sulfate and concentrated to near dryness under vacuum. The resultant yellow gummy product was slurried in 100 ml of diethyl ether. The insoluble material was collected and shown to be pure product. The ether filtrate was treated with 700 ml of heptane and stirred at room temperature overnight. The precipitated solid was collected and combined with the first collected product.

After drying under vacuum, 29.1 grams (57.5 mmoles, 84% yield) of product was obtained as a yellow solid. Pure by proton and carbon NMR; MS: [MH]+507 m/e.

6-t-Butyl-3-(3,5-bis[4-(pentyloxy)phenyl]- 1H-pyrazol-1-yl)-7H-1,2,4-triazolo[3,4-b][1,3,4]thiadiazine, Intermediate-19d.

Into a 1 L single neck round bottom flask was placed 20 grams (39.5 mmoles) of Intermediate-19c and 315 ml of ethanol. To the stirred slurry was added 5.45 grams (42.2 mmoles) of bromopinacolone. The reaction was stirred and brought to reflux for 2 hours. The product mixture was cooled to room temperature and concentrated to an oil under vacuum. The oil was treated with 20 ml of ethanol and 200 ml of isopropyl ether and stirred slowly for 1 hour. The resulting solid was collected by filtration, washed with isopropyl ether and dried to afford 11.24 grams (19.2 mmoles, 48.6% yield) of white product. Pure by proton and carbon NMR, MS: [MH]+=587 m/e.

6-t-Butyl-3-(3,5-bis [4-(pentyloxy)phenyl]- 1 H-pyrazol- 1 -yl)- I H-pyrazolo[5,1-c]-1,2,4-triazole, Coupler 19.

Into a 1 L single neck round bottom flask was placed 10.2 grams (17.4 mmoles) of Intermediate-19d and 430 ml of acetic anhydride. The mixture was stirred and heated at reflux for 3 hours. After cooling to room temperature, the mixture was concentrated under vacuum to an oil. The oil was dissolved in 105 ml of acetic acid and 61 ml of concentrated hydrochloric acid was added. This mixture was heated at 100° C. for 2.5 hours, then cooled to room temperature, and poured into 170 ml of ice water. The mixture was neutralized with concentrated ammonium hydroxide and the precipitated product collected by filtration. After recrystallization from methanol 5.3 grams (9.57 mmoles, 55% yield) of pure white Coupler 19 product was obtained, m.p. 187–188° C.. Pure by proton and carbon NMR, MS: [MH]+=555 m/e.

Example 2

Synthesis of Coupler 30, Method B.

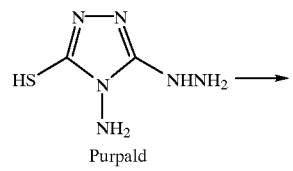

Purpald

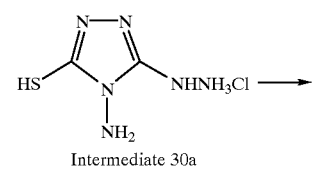

Intermediate 30a

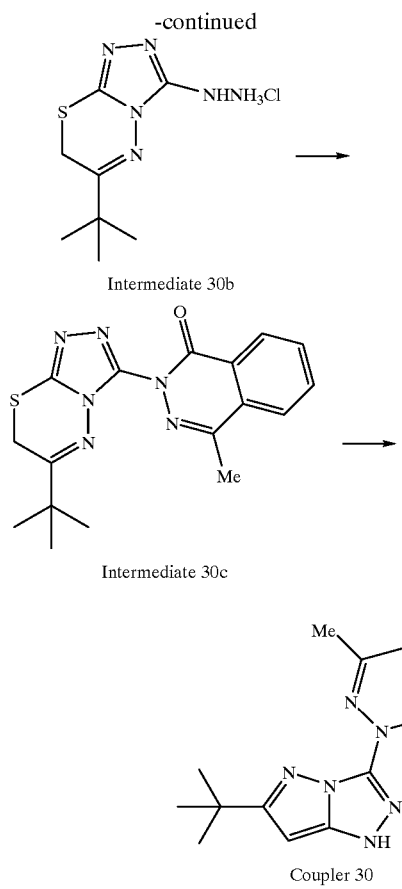

Intermediate 30b

Intermediate 30c

Coupler 30

Purpald hydrochloride, Intermediate-30a.

Into a 1 L round bottom flask was placed 50 grams (0.34 moles) of Purpald and 400 ml of water. To the stirred slurry at room temperature was added 100 ml of concentrated hydrochloric acid. The mixture was warmed and stirred until completely homogeneous. The clear colorless solution was concentrated to dryness under vacuum to afford 62.2 grams (0.34 mmoles, 100% yield) of white powder product.

6-t-Butyl-3-hydrazino-7H-1,2,4-triazolo[3,4-b][1,3,4]thiadiazine hydrochloride, Intermediate-30b.

Into a 1 L round bottom flask was placed 42.3 grams (0.23 moles) of Intermediate-30a and 300 ml of ethanol. To the slurry at room temperature was added 46.2 grams (0.26 moles) of bromopinacolone. The reaction was refluxed for 3 hours with stirring. After cooling to room temperature the product mixture was concentrated to near dryness under vacuum and the wet slurry of product was diluted with 150 ml of acetonitrile. After stirring at room temperature for 30 minutes the product was collected by filtration and washed with 50 ml of acetonitrile. After drying under high vacuum, 56.1 grams (21.4 mmoles, 93% yield) of slightly hydroscopic white powder product was obtained. MS: [MH]+227 m/e for the hydrazine base.

2-(6-t-Butyl-7H-1,2,4-triazolo[3,4-b][1,3,4]thiadiazin-3-yl)-4-methyl-1(2H)phthalazinone, Intermediate-30c.

Into a 100 ml round bottom flask was placed 5.2 grams (20 mmol) of Intermediate-30b and 50 ml of ethanol. To the stirred slurry at room temperature was added 5.76 grams (30 mmoles) of ethyl 2-acetylbenzoate (Tetrahedron Lett. (1990), 31(47), 6781-4). The mixture was heated at reflux for 6 hours. After cooling to room temperature 30 ml of water was added and the product mixture was cooled in an ice/ethanol bath. After stirring for 30 minutes the crystalline product was collected by filtration and washed with 30 ml of ethanol. The product was dried to afford 4.5 grams (12.7 mmoles, 65% yield) of white crystals. Pure by proton and carbon NMR, MS: [MH]+=355 m/e.

2-(6-t-Butyl-1H-pyrazolo[5,1-c]-1,2,4-triazol-3-yl)-4-methyl-1(2H)phthalazinone, Coupler 30.

Into a 100 ml round bottom flask was placed 2.0 grams (5.6 mmoles) of Intermediate-30c and 50 ml of acetic anhydride. The slurry was stirred under nitrogen and heated to reflux for 6 hours. After cooling to room temperature the mixture was concentrated to near dryness under vacuum. To the white amorphous product was added 10 ml of glacial acetic acid and 10 ml of concentrated hydrochloric acid. The mixture was stirred and heated at 100° C. for 90 minutes. After cooling to room temperature the mixture was poured into 100 ml of ice water then neutralized with concentrated ammonium hydroxide. The resulting white product was collected by filtration and dried to afford 1.62 grams (5.0 mmoles, 89.8% yield) of Coupler 30. Pure by proton and carbon NMR, MS: [MH]+=323 m/e.

Example 3

Synthesis of Coupler 25 and Coupler 35. Method A.

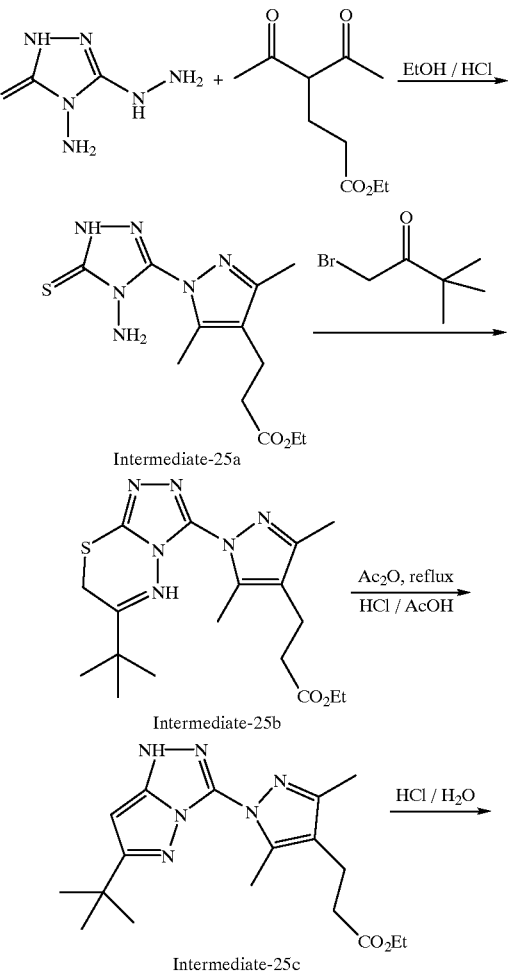

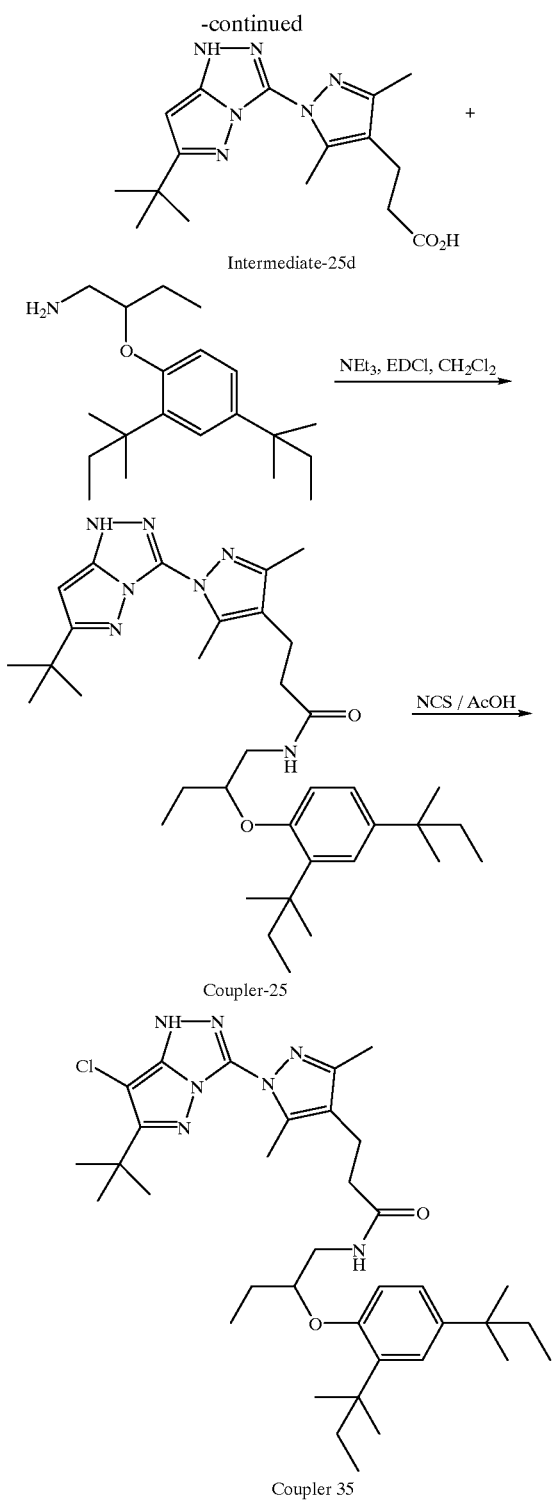

heated at reflux for 15 h and evaporated under reduced pressure. The residue was dissolved in methylene chloride and washed with saturated NaHCO₃ The two phases were separated and the aqueous phase was extracted with methylene chloride. The organic phase was dried over magnesium sulfate, filtered and evaporated. The residue was crystallized from isopropyl ether to give 11 g of Intermediate-25b.

Intermediate-25c

A solution of Intermediate-25b (11 g) in acetic anhydride (60 ml) was heated at reflux for 6 h. The reaction mixture was evaporated under reduced pressure and the residue treated with acetic acid (60 ml) and concentrated hydrochloric acid (10 ml). After cooling to room temperature, the mixture was poured into iced water and the solution was treated with concentrated ammonium hydroxide to pH 9-10 and extracted with ethyl acetate. The organic phase was dried over magnesium sulfate, filtered and evaporated. The residue was purified by flash chromatography to afford 3.8 g of Intermediate-25c.

Intermediate-25d 4 g of Intermediate-25c was suspended in water (90 ml) and concentrated HCl (10 ml). The mixture was heated at reflux for 16 h, and then extracted with ethyl acetate. The organic layer was dried over magnesium sulfate, filtered and evaporated. The residue was crystallized from isopropyl ether and afforded 3.5 g of Intermediate-25d.

Coupler 25

The mixture of Intermediate-25d (3.3 g), 4-(2,4-di-tert-amylphenyloxy)butylamine hydrochloride (4.44 g), 1-[3-(dimethylamino)propyl]-3-ethylcarbodiimide hydrochloride (2.9 g), triethylamine (2.8 ml) and methylene chloride (60 ml) was stirred at room temperature for 4 days. It was then diluted with methylene chloride and washed with water. The organic layer was dried over magnesium sulfate , filtered and evaporated. The residue was purified by flash chromatography and afforded 5.1 g of Coupler-25.

Coupler 35

A solution of coupler-25 (1.55 g) and N-Chlorosuccinimide (0.37 g) in 15 ml of acetic acid was stirred at room temperature for 16 h. The mixture was evaporated under reduced pressure and was purified by flash chromatography to afford 1.6 g of Coupler-35.

Example 4

Synthesis of Coupler 27. Method A

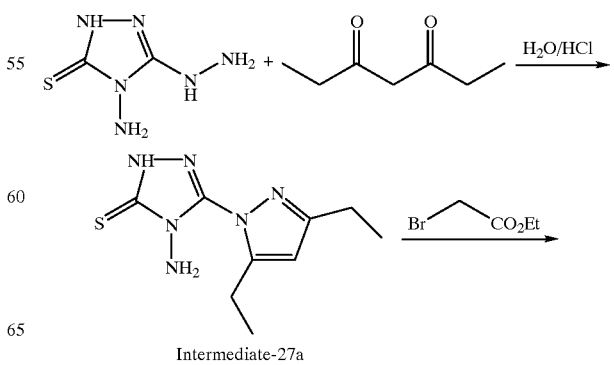

Intermediate-27a

Intermediate-25a 16.4 g of 4-acetyl-5-oxohexanoate was added to a suspension of 10 g of Purpald in 200 ml of ethyl alcohol and 20 ml of hydrochloric acid. The reaction mixture was heated at reflux for 16 h. After cooling to room temperature, the mixture was treated with 80 ml of ether. The Intermediate-25a was isolated by filtration. 11.43 g.

Intermediate-25b

A mixture of Intermediate-25a (10 g), α-bromopinacolone (6.35 g) and ethyl alcohol (80 ml) was

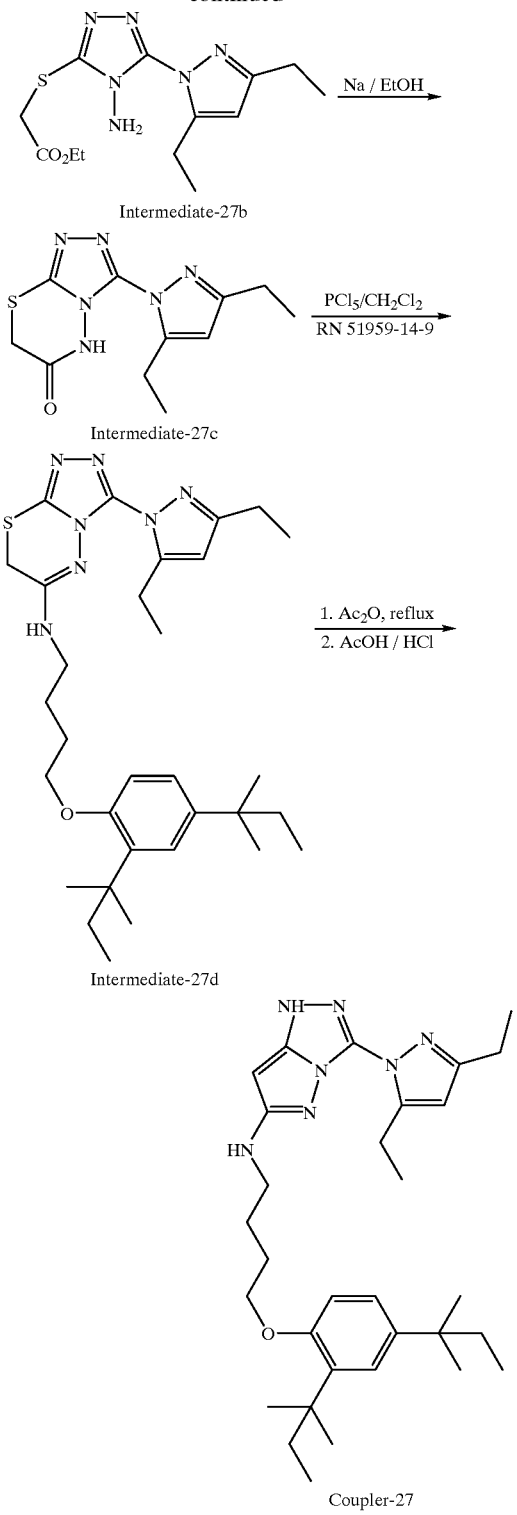

Intermediate-27a.

A suspension of 25.9 g of Purpald in 350 ml of water and 35 ml of concentrated hydrochloric acid was heated until the solution became clear. 25 g of 3,5-heptanedione was added and the reaction mixture was heated at reflux for 15 h. The reaction mixture was stirred in an ice-ethanol bath for 30 minutes and the Intermediate-27a was isolated by filtration 42.2 g (100%).

Intermediate-27b.

15 g of Intermediate-27a was dissolved into 150 ml of ethyl alcohol. It was then treated with 12.6 g of ethyl bromoacetate and the mixture was heated at reflux for 15 h. After cooling to room temperature, it was evaporated under reduced pressure and the residue was partitioned between 100 ml of methylene chloride and 100 ml of saturated NaHCO$_3$. After CO$_2$ evolvement had ceased, the two phases were separated and the aqueous phase was extracted twice with methylene chloride. The combined organic phase was dried over sodium sulfate, filtered and evaporated. The residue was crystallized from ethyl acetate and ligroin to afford 13.26 g (65%) of Intermediate 27-b.

Intermediate-27c.

1 g of sodium was dissolved into 100 ml of ethyl alcohol. After complete dissolution, 7 g of Intermediate 27-b was added the mixture was heated at reflux for 16 h. The mixture was evaporated under reduced pressure and the residue was dissolved into 200 ml of water. The aqueous layer was acidified with hydrochloric acid 6N and extracted with methylene chloride. The combined organic phase was dried over sodium sulfate, filtered and evaporated. The residue was crystallized from ether and filtered to produce 6 g (100%) of Intermediate-27c.

Intermediate-27d.

To a suspension of 6.1 g of phosphorus pentachloride in 20 ml of methylene chloride was slowly added a solution of 4.5 g Intermediate-27c in 40 ml of methylene chloride. After 2 h. At room temperature, the mixture was cooled at 0° C. and treated with 100 ml of saturated NaHCO$_3$ for 45 minutes. The mixture was transferred into a separatory funnel and further diluted with water and methylene chloride. The two phases were separated and the aqueous phase was extracted with methylene chloride. The combined organic phase was dried over sodium sulfate, filtered and evaporated. The residue was dissolved in 20 ml of dioxane and treated with a solution of 3.5 g of 4-(2,4-di-tert-amylphenyloxy)butylamine in 40 ml of dioxane and 3.4 ml of triethylamine. After 1 h at room temperature, the mixture was diluted with water and extracted with ethyl acetate. The organic layer was dried over magnesium sulfate, filtered and evaporated. The residue was purified by flash chromatography to afford 8.14 g (89%) of Intermediate-27d.

Coupler 27.

A solution of Intermediate-27d (1.2 g) in 20 ml of acetic anhydride was heated at reflux for 4 h. The mixture was evaporated under reduced pressure and the residue was treated with 15 ml of acetic acid and 5 ml of concentrated hydrochloric acid. The mixture was heated at 110° C. for 2 h. After cooling to room temperature, it was poured into an ice-water, treated with concentrated ammonium hydroxide to pH 9–10 and extracted with ethyl acetate. The organic phase was dried over magnesium sulfate, filtered and evaporated. The residue was purified by flash chromatography to afford 0.28 g of Coupler-27.

Example 5

Synthesis of Coupler 28. Method B.

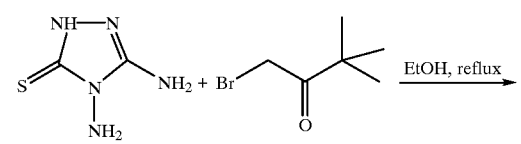

-continued

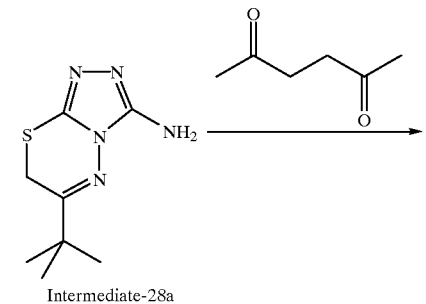

Intermediate-28a

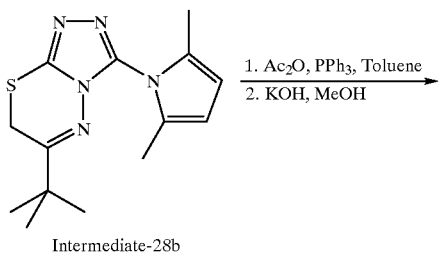

Intermediate-28b

1. Ac$_2$O, PPh$_3$, Toluene
2. KOH, MeOH

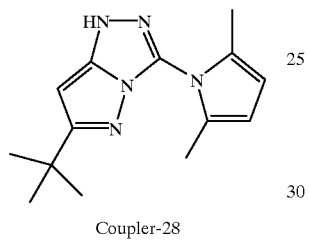

Coupler-28

Intermediate-28a.

A suspension of 3,4-diamino-5-mercapto-1,2,4-triazole (5.3 g) in ethyl alcohol (70 ml) was treated with α-bromopinacolone. The mixture was heated at reflux for 15 h and evaporated under reduced pressure. The residue was diluted with methylene chloride and washed with saturated sodium bicarbonate. The organic phase was dried over magnesium sulfate, filtered and evaporated. The residue was suspended in a mixture of methylene chloride and ligroin and stirred at room temperature for 15 minutes. Intermediate-28a (6.8 g) was isolated by filtration.

Intermediate-28b.

A mixture of Intermediate-28a (4.2 g), 2,5-hexanedione (6.8 g), glacial acetic acid (20 ml) and toluene (15 ml) was heated at reflux for 60 h. The reaction mixture was evaporated, the residue was diluted with ethyl acetate and washed with saturated NaHCO$_3$. The two phases were separated and the aqueous layer extracted with ethyl acetate. The organic phase was dried over magnesium sulfate, filtered and evaporated. The residue was purified by flash chromatography to afford Intermediate-28b (4.6 g).

Coupler 28.

A mixture of Intermediate-28b (1 g), acetic anhydride (3.4 ml), triphenylphosphine (4.76 g) and toluene (8 ml) was heated at reflux for 22 h. The mixture evaporated under reduced pressure, dissolved in a methanol-THF mixture (25 ml) and treated with potassium hydroxide 1N to pH 10. The mixture was stirred at room temperature for 1 h, evaporated under reduced pressure, diluted with ethyl acetate and washed with saturated ammonium chloride. The organic phase was dried over magnesium sulfate, filtered and evaporated. The residue was purified by flash chromatography to afford Coupler-28 (0.8 g).

Dyes of the present invention can be prepared by reactions and methods described below. Typical syntheses are illustrated by the following examples.

Example 6

Synthesis of Dye 1.

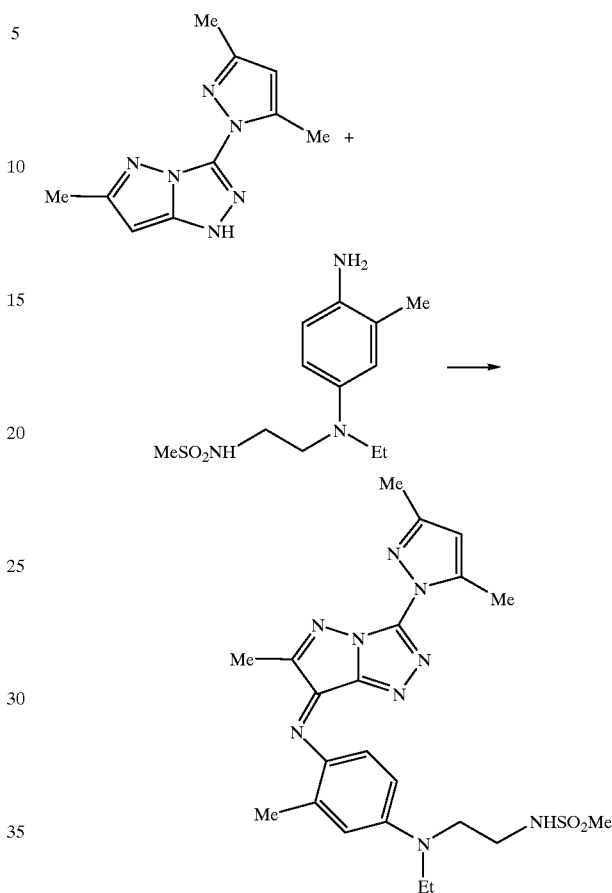

To a solution of 0.2 grams (0.93 mmoles) of Coupler 1 in 20 ml of ethyl acetate was added 0.5 grams (6 mmoles) of sodium carbonate at room temperature. The mixture was rapidly stirred and 0.5 grams (1.85 mmoles) of 4-amino-3-methyl-N-ethyl-N-(2-methanesulfonamidoethyl)aniline sesquisulfate hydrate was added then 1.16 grams (4.3 mmoles) of potassium persulfate were added. The reaction was stirred for 20 minutes at room temperature. The product mixture was poured into a separatory funnel, diluted with 100 ml of water and the product dye extracted with 100 ml of ethyl acetate. The organic layer was concentrated in vacuum and the dye purified by silica gel flash column chromatography. Yield of Dye 1 was 0.1 grams (0.2 mmoles, 22% yield), λ max 536 nm (EtOAc), ε=57,300; MS: [MH]+=484 m/e; NMR (CDCl$_3$): proton analysis shows five methyl absorbances at δ 2.35 ppm, 2.45 ppm, 2.5 ppm, 2.6 ppm, and 3.0 ppm characteristic of Dye 1. This shows that the pyrazole ring was not removed during the dye forming reaction and therefore the pyrazole ring does not act as a coupling off group.

Example 7

Synthesis of Dye 28.

A mixture of Coupler-28 (0.3 g), 4-amino-3-methyl-N-ethyl-N-(2-methanesulfonamidoethyl)aniline sesquisulfate hydrate (0.7 g), sodium carbonate (0.74 g), ethyl acetate (30 ml) and water (30 ml) was treated with potassium persulfate (1.45 g). After 25 minutes at room temperature, the reaction mixture was diluted with water and ethyl acetate. The organic phase was dried over magnesium sulfate, filtered and evaporated. The residue was purified by flash chromatography and afforded Dye-28 (0.16 g).

The absorbance maximum in solution for some of the dyes of this invention are shown in Table 1 and Table 2. As shown in Table 1 the dyes of this invention when substituted with a t-butyl group at the 6 position of the pyrazolo[5,1-c]-1,2,4-triazole ring have absorbance maximum in solution which is similar to or slightly deeper than the azomethine dye Comparison Dye CD-1 whose structure is shown below. Further the dyes of the Invention have half band widths which are similar to or slightly narrower than the azomethine dye Comparison Dye CD-1.

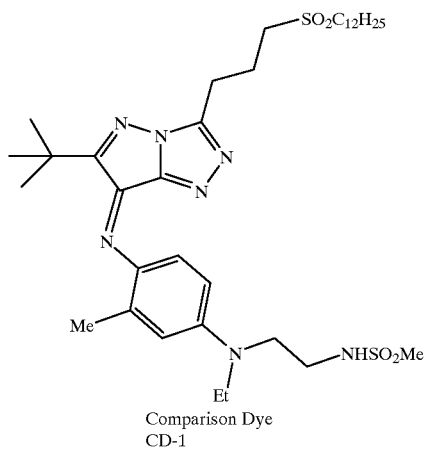

Comparison Dye
CD-1

TABLE 1

| Dye | Absorbance maximum (MeCN solution) | Half Band Width |
|---|---|---|
| Comparison Dye CD-1 | 542 nm | 81 nm |
| Invention Dye 1 | 540 nm | 80 nm |
| Invention Dye 2 | 543 nm | 76 nm |
| Invention Dye 3 | 549 nm | 75 nm |
| Invention Dye 4 | 546 nm | 74 nm |
| Invention Dye 5 | 552 nm | 76 nm |
| Invention Dye 6 | 542 nm | 80 nm |
| Invention Dye 7 | 538 nm | 80 nm |
| Invention Dye 8 | 544 nm | 78 nm |
| Invention Dye 9 | 542 nm | 80 nm |
| Invention Dye 10 | 542 nm | 78 nm |
| Invention Dye 11 | 542 nm | 78 nm |
| Invention Dye 12 | 544 nm | 82 nm |
| Invention Dye 13 | 540 nm | 80 nm |
| Invention Dye 14 | 540 nm | 80 nm |
| Invention Dye 15 | 542 nm | 80 nm |
| Invention Dye 16 | 542 nm | 80 nm |
| Invention Dye 17 | 544 nm | 76 nm |
| Invention Dye 18 | 550 nm | 76 nm |
| Invention Dye 19 | 548 nm | 76 nm |
| Invention Dye 20 | 540 nm | 78 nm |
| Invention Dye 21 | 540 nm | 80 nm |
| Invention Dye 22 | 548 nm | 80 nm |

TABLE 2

| Dye | Absorbance maximum (solution) | Half Band Width |
|---|---|---|
| Invention Dye 23 | 536 nm (EtOAc) | 71 nm |
| Invention Dye 25 | 544 nm (MeCN) | 80 nm |
| Invention Dye 26 | 525 nm (EtOAc) | 74 nm |

TABLE 2-continued

| Dye | Absorbance maximum (solution) | Half Band Width |
|---|---|---|
| Invention Dye 27 | 506 nm (EtOAc) | 80 nm |
| Invention Dye 28 | 540 nm (EtOAc) | 75 nm |
| Invention Dye 29 | 524 nm (EtOAc) | 75 nm |
| Invention Dye 30 | 537 nm (EtOAc) | 80 nm |
| Invention Dye 31 | 585 nm (EtOAc) | 80 nm |
| Invention Dye 32 | 544 nm (EtOAc) | 80 nm |

The following example illustrates the practice of the present invention in a silver halide photographic element and the advantage in light stability of the resultant magenta image dyes of the invention when compared with the comparison coupler CM-1 whose structure is shown below.

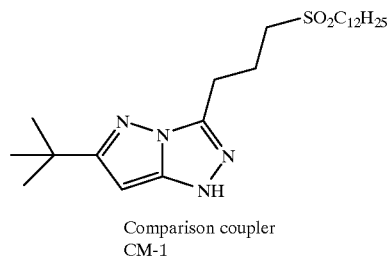

Comparison coupler
CM-1

Preparation of Photographic Elements

Coupler CM-1, stabilizers ST-1 and ST-2, and coupler solvents dibutyl phthalate and diundecyl phthalate were dispersed in aqueous gelatin in the following manner. Coupler CM-1 (0.473 g, $1.08 \times 10^{-3}$ mole), stabilizer ST-1 (0.366 g, $1.08 \times 10^{-3}$ mole) and stabilizer S-2 (0.506 g, $1.08 \times 10^{-3}$ mole) were dissolved in a mixture of diundecyl phthalate (0.862 g) and ethyl acetate (1.419 g). The mixture was heated to effect solution. After adding a solution of aqueous gelatin (15.98 g, 11.50%), surfactant diisopropylnaphthalene sulfonic acid (sodium salt) (1.84 g 10% solution), and water to make a total of 30.62 grams, the mixture was dispersed by passing it three times through a Gaulin homogenizer. This dispersion was used in the preparation of photographic element 101.

Dispersions containing the couplers shown for elements 102 and 103 in Tables 3 and 4 were prepared in a similar manner. The amount of coupler in each dispersion was $1.08 \times 10^{-3}$ mole, and other components were the same as in Example 101.

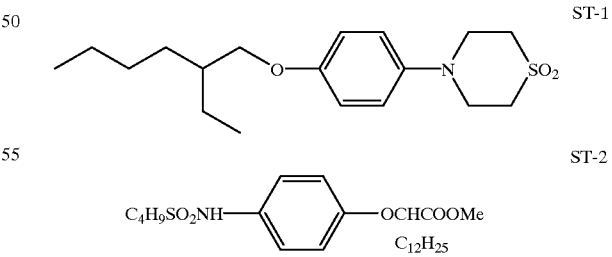

The photographic elements were prepared as follows:
On a gel-subbed, polyethylene-coated paper support were coated the following layers:

First Layer: An underlayer containing 3.23 grams gelatin per square meter.

Second Layer: A photosensitive layer containing (per square meter) 3.22 grams total gelatin, an amount of green-sensitized silver chloride emulsion containing 0.344 grams silver, the dispersion containing $5.37 \times 10^{-4}$ mole of the coupler indicated in Table 1; and 0.043 gram surfactant diisopropylnaphthalene sulfonic acid (sodium salt) (in addition to the surfactant used to prepare the coupler dispersion).

Third Layer: A protective layer containing (per square meter) 1.40 grams gelatin, 0.15 gram bis(vinylsulfonyl) methyl ether, 0.043 gram surfactant diisopropylnaphthalene sulfonic acid (sodium salt), and $4.40 \times 10^{-6}$ gram surfactant tetraethylammonium perfluorooctanesulfonate.

Processed samples were prepared by exposing the coatings through a step wedge and processing as follows:

| Process Step | Time (min.) | Temp. (C.) |
| --- | --- | --- |
| Developer | 0.75 | 35.0 |
| Bleach-Fix | 0.75 | 35.0 |
| Water wash | 1.50 | 35.0 |

The processing solutions used in the above process had the following compositions (amounts per liter of solution):

| Developer | | |
| --- | --- | --- |
| Triethanolamine | 12.41 | g |
| Blankophor REU (trademark of Mobay Corp.) | 2.30 | g |
| Lithium polystyrene sulfonate | 0.09 | g |
| N,N-Diethylhydroxylamine | 4.59 | g |
| Lithium sulfate | 2.70 | g |
| 4-Amino-3-methyl-N-ethyl-N-(2-methansulfonamidoethyl)aniline sesquisulfate hydrate | 5.00 | g |
| 1-Hydroxyethyl-1,1-diphosphonic acid | 0.49 | g |
| Potassium carbonate, anhydrous | 21.16 | g |
| Potassium chloride | 1.60 | g |
| Potassium bromide | 7.00 | mg |
| pH adjusted to 10.4 at 26.7 C. | | |
| Bleach-Fix | | |
| Solution of ammonium thiosulfate | 71.85 | g |
| Ammonium sulfite | 5.10 | g |
| Sodium metabisulfite | 10.00 | g |
| Acetic acid | 10.20 | g |
| Ammonium ferric ethylenediaminetetra acetate | 48.58 | g |
| Ethylenediaminetetraacetic acid | 3.86 | g |
| pH adjusted to 6.7 at 26.7 C. | | |

The processed color photographic paper strips were measured for fresh absorbance maximum ($\lambda$ max), absorbance band width at half maximum density height (HBW), and density at absorbance maximum (Dens). The data are shown in Table 3.

The processed strips were covered with a UV-absorbing filter (in lieu of coating a similar composition over the photosensitive layer of the element) and subjected to irradiation by a xenon arc lamp at an intensity of 50Klux for 2 weeks. Additional strips were subjected to incubation at 75° C./50% RH for 2 weeks. The losses in optical density to green light from a fresh density of 1.0 were recorded as Light Fade and Dark Fade, respectively. Printout (increase in blue density in the Dmin area upon light fade evaluation) and yellowing (increase in blue density in the Dmin area upon dark fade evaluation) were also recorded. The data are shown in Table 4.

TABLE 3

| Element | Coupler | $\lambda$ max | HBW | Dens |
| --- | --- | --- | --- | --- |
| 101 | comparison CM-1 | 547 nm | 100 nm | 0.92 |
| 102 | invention coupler 25 | 559 nm | 96 nm | 0.95 |
| 103 | invention coupler 19 | 565 nm | 94 nm | 1.02 |

TABLE 4

| Element | Coupler | Light Fade | Printout | Dark Fade | Yellowing |
| --- | --- | --- | --- | --- | --- |
| 101 | comparison CM-1 | −25% | +0.26 | +0.01 | +0.03 |
| 102 | invention coupler 25 | −14% | +0.08 | +0.02 | +0.04 |
| 103 | invention coupler 19 | −14% | +0.10 | +0.01 | +0.03 |

The data in Tables 3 and 4 indicate that the couplers according to the present invention offer improved light stability with a deeper absorbance maximum and without unwanted absorbance band shape broadening compared with couplers of the prior art.

The invention has been described in detail with particular reference to preferred embodiments thereof. It will be understood that variations and modifications can be made within the spirit and scope of the invention.

What is claimed is:

1. A formulation for the oxidation dyeing of keratin fibers comprising a compound of the formula I as a coupler:

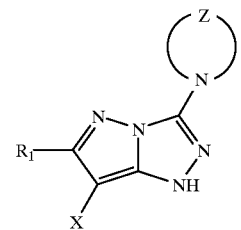

wherein Z together with the nitrogen to which it is attached forms a substituted or unsubstituted heterocyclic 5 or 6 member ring selected from the group consisting of phthalazine, phthalimide, pyrazole, pyrazolidine, pyrazolinone pyrimidine, pyrrole, pyrrolidine and pyrroline, $R_1$ represents a substituent group, and X represents a hydrogen or coupling off group, or an acid salt thereof, in a medium suitable for dyeing, and an oxidation base, wherein said coupler and oxidation base are present in amounts effective to dye said keratin fibers.

2. The formulation of claim 1 wherein the acid salts are selected from the group consisting of hydrochlorides, hydrobromides, sulfides, tartrates, benzenesulfonates, lactates, tosylates and acetates.

3. The formulation of claim 1 in which the compound having formula I represents 0.0005–12 wt % of the total weight of the dye formulation.

4. The formulation according to claim 1, wherein the oxidation base is selected from para-phenylenediamines, bisphenylalkylenediamines, para-aminophenols, ortho-aminophenols, heterocyclic bases, and their acid addition salts.

5. The formulation according to claim 4 wherein the oxidation base represents 0.0005–12 wt % of the total weight of the formulation.

6. The formulation according to claim 5 wherein the oxidation base represents 0.005–6 wt % of the total weight of the formulation.

7. The formulation of claim 1 that contains one or more additional couplers which are different from the compounds having formula I and/or one or more direct dyes.

8. The formulation of claim 1 comprising as a suitable medium for dyeing water or a mixture of water and at least one organic solvent.

9. The formulation of claim 8 additionally comprising C1–C4 alcohols, glycerol, glycols, glycol ethers, or aromatic alcohols.

10. The formulation of claim 8 exhibiting a pH value of 3–12.

11. The formulation of claim 1 characterized in that it is in the form of a liquid, cream, gel, or foam.

12. Method for oxidation dyeing of keratin fibers comprising contacting the fibers with at least one dye formulation as defined in claim 1 and an oxidizing agent.

13. Method according to claim 12 wherein oxidizing agent is chosen from hydrogen peroxide, urea peroxide, alkali metal bromates, and per-salts.

14. Device or kit for dyeing keratin fibers comprising a first compartment which contains a dye formulation as defined in claim 1, and a second compartment which contains an oxidizing composition.

* * * * *